US008342963B2

(12) United States Patent
Steiner et al.

(10) Patent No.: US 8,342,963 B2
(45) Date of Patent: Jan. 1, 2013

(54) METHODS AND SYSTEMS FOR ENABLING CONTROL OF ARTIFICIAL INTELLIGENCE GAME CHARACTERS

(75) Inventors: Travis Steiner, Issaquah, WA (US); Eric Housden, Kirkland, WA (US); Robbie Klapka, Redmond, WA (US); Tom Sternberg, Clyde Hill, WA (US); Brandon Whitley, Redmond, WA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 502 days.

(21) Appl. No.: 12/422,227

(22) Filed: Apr. 10, 2009

(65) Prior Publication Data

US 2010/0261527 A1 Oct. 14, 2010

(51) Int. Cl.
*A63F 9/24* (2006.01)
(52) U.S. Cl. ......................................................... 463/36
(58) Field of Classification Search ...................... 463/36
See application file for complete search history.

(56) References Cited

U.S. PATENT DOCUMENTS

| 3,943,277 A | 3/1976 | Everly et al. ................... 348/169 |
| 4,263,504 A | 4/1981 | Thomas .......................... 235/454 |
| 4,313,227 A | 1/1982 | Eder ............... 398/106 |
| 4,558,864 A | 12/1985 | Medwedeff .............. 273/148 B |
| 4,565,999 A | 1/1986 | King et al. ..................... 345/158 |
| 4,802,227 A | 1/1989 | Elko et al. ....................... 381/92 |
| 4,823,001 A | 4/1989 | Kobayashi et al. ........... 356/616 |
| 4,843,568 A | 6/1989 | Krueger et al. ............... 382/100 |
| 5,034,986 A | 7/1991 | Karmann et al. ............. 382/103 |
| 5,055,840 A | 10/1991 | Bartlett ............................. 341/31 |
| 5,111,401 A | 5/1992 | Everett et al. ................... 701/24 |
| 5,144,594 A | 9/1992 | Gilchrist ........................ 367/129 |
| 5,260,556 A | 11/1993 | Lake et al. ..................... 235/494 |
| 5,297,061 A | 3/1994 | Dementhon et al. .......... 345/180 |
| 5,335,011 A | 8/1994 | Addeo et al. .................... 348/15 |

(Continued)

FOREIGN PATENT DOCUMENTS

EP 0353200 1/1990

(Continued)

OTHER PUBLICATIONS

"The Tracking Cube: A Three-Dimentional Input Device", IBM Technical Disclosure Bulletin, Aug. 1, 1989, pp. 91-95, No. 3B, IBM Corp.New York, U.S.

(Continued)

*Primary Examiner* — Wai Sing Louie
*Assistant Examiner* — Robert Carpenter
(74) *Attorney, Agent, or Firm* — Martine Penilla Group, LLP

(57) ABSTRACT

A method for controlling an artificial-intelligence (AI) character includes entering a command mode which enables control of the AI character, and occurs while substantially maintaining an existing display of the game, thereby preserving the immersive experience of the video game for the player. A plurality of locations are sequentially specified within a virtual space of the game, the plurality of locations defining a path for the AI character. The AI character is moved along the path to the plurality of locations in the order they were specified. The plurality of locations may be specified by maneuvering a reticle, and selecting each of the locations. A node can be displayed in the existing display of the game at each of the plurality of locations. A series of lines connecting the nodes can also be displayed in the existing display of the game.

23 Claims, 11 Drawing Sheets

U.S. PATENT DOCUMENTS

| | | | |
|---|---|---|---|
| 5,394,168 A | 2/1995 | Smith, III et al. | 345/156 |
| 5,426,450 A | 6/1995 | Drumm | 345/168 |
| 5,455,685 A | 10/1995 | Mori | 348/363 |
| 5,473,701 A | 12/1995 | Cezanne et al. | 381/92 |
| 5,485,273 A | 1/1996 | Mark et al. | 356/350 |
| 5,534,917 A | 7/1996 | MacDougall | 348/169 |
| 5,543,818 A | 8/1996 | Scott | 345/168 |
| 5,557,684 A | 9/1996 | Wang et al. | 382/107 |
| 5,563,988 A | 10/1996 | Maes et al. | 345/421 |
| 5,568,928 A | 10/1996 | Munson et al. | 463/37 |
| 5,581,276 A | 12/1996 | Cipolla et al. | 345/156 |
| 5,583,478 A | 12/1996 | Renzi | 340/407.1 |
| 5,586,231 A | 12/1996 | Florent et al. | 345/472 |
| 5,611,731 A | 3/1997 | Bouton et al. | 463/37 |
| 5,616,078 A | 4/1997 | Oh | 463/8 |
| 5,638,228 A | 6/1997 | Thomas, III | 360/60 |
| 5,649,021 A | 7/1997 | Matey et al. | 382/128 |
| 5,675,825 A | 10/1997 | Dreyer et al. | 395/800 |
| 5,675,828 A | 10/1997 | Stoel et al. | 395/825 |
| 5,677,710 A | 10/1997 | Thompson-Rohrlich | 345/173 |
| 5,706,364 A | 1/1998 | Kopec et al. | 382/159 |
| 5,768,415 A | 6/1998 | Jagadish et al. | 382/154 |
| 5,796,354 A | 8/1998 | Cartabiano et al. | 341/22 |
| 5,818,424 A | 10/1998 | Korth | 345/158 |
| 5,846,086 A | 12/1998 | Bizzi et al. | 434/247 |
| 5,850,222 A | 12/1998 | Cone | 345/418 |
| 5,850,473 A | 12/1998 | Andersson | 382/165 |
| 5,861,910 A | 1/1999 | McGarry et al. | 348/87 |
| 5,870,100 A | 2/1999 | DeFreitas | 345/441 |
| 5,883,616 A | 3/1999 | Koizumi et al. | 345/156 |
| 5,889,672 A | 3/1999 | Schuler et al. | 700/83 |
| 5,900,863 A | 5/1999 | Numazaki | 345/158 |
| 5,913,727 A | 6/1999 | Ahdoot | 463/39 |
| 5,914,723 A | 6/1999 | Gajewska | 345/597 |
| 5,917,493 A | 6/1999 | Tan et al. | 715/835 |
| 5,923,306 A | 7/1999 | Smith et al. | 345/2 |
| 5,923,318 A | 7/1999 | Zhai et al. | 345/157 |
| 5,929,444 A | 7/1999 | Leichner | 250/341.7 |
| 5,930,383 A | 7/1999 | Netaer | 382/154 |
| 5,930,741 A | 7/1999 | Kramer | 702/153 |
| 5,937,081 A | 8/1999 | O'Brill et al. | 382/111 |
| 5,959,596 A | 9/1999 | McCarten et al. | 345/2 |
| 5,963,250 A | 10/1999 | Parker et al. | 348/211.6 |
| 5,993,314 A | 11/1999 | Dannenberg et al. | 461/1 |
| 6,009,210 A | 12/1999 | Kang | 382/276 |
| 6,021,219 A | 2/2000 | Andersson et al. | 382/190 |
| 6,031,545 A | 2/2000 | Ellenby et al. | 345/435 |
| 6,031,934 A | 2/2000 | Ahmad et al. | 382/154 |
| 6,037,942 A | 3/2000 | Millington | 715/835 |
| 6,044,181 A | 3/2000 | Szeliski et al. | 382/284 |
| 6,049,619 A | 4/2000 | Anandan et al. | 382/107 |
| 6,056,640 A | 5/2000 | Schaaij | 463/4 |
| 6,057,909 A | 5/2000 | Yahav et al. | 356/5.04 |
| 6,061,055 A | 5/2000 | Marks | 382/276 |
| 6,075,895 A | 6/2000 | Qiao et al. | 382/218 |
| 6,078,789 A | 6/2000 | Bodenmann et al. | 455/66 |
| 6,091,905 A | 7/2000 | Yahav et al. | 396/106 |
| 6,094,625 A | 7/2000 | Ralston | 702/150 |
| 6,097,369 A | 8/2000 | Wambach | 345/158 |
| 6,100,517 A | 8/2000 | Yahav et al. | 250/208.1 |
| 6,100,895 A | 8/2000 | Miura et al. | 345/426 |
| 6,101,289 A | 8/2000 | Kellner | 382/276 |
| 6,115,052 A | 9/2000 | Freeman et al. | 345/473 |
| 6,134,346 A | 10/2000 | Berman et al. | 382/163 |
| 6,144,367 A | 11/2000 | Berstis | 345/158 |
| 6,151,009 A | 11/2000 | Kanade et al. | 345/641 |
| 6,160,540 A | 12/2000 | Fishkin et al. | 345/184 |
| 6,166,744 A | 12/2000 | Jaszlics et al. | 345/435 |
| 6,173,059 B1 | 1/2001 | Huang et al. | 381/92 |
| 6,175,343 B1 | 1/2001 | Mitchell et al. | 345/8 |
| 6,184,863 B1 | 2/2001 | Sibert et al. | 345/156 |
| 6,191,773 B1 | 2/2001 | Maruno et al. | 345/158 |
| 6,195,104 B1 | 2/2001 | Lyons | 345/473 |
| 6,215,898 B1 | 4/2001 | Woodfill et al. | 382/154 |
| 6,243,491 B1 | 6/2001 | Andersson | 382/165 |
| 6,275,213 B1 | 8/2001 | Tremblay et al. | 345/156 |
| 6,281,930 B1 | 8/2001 | Parker et al. | 348/211.9 |
| 6,282,362 B1 | 8/2001 | Murphy et al. | 386/46 |
| 6,295,064 B1 | 9/2001 | Yamaguchi | 345/419 |
| 6,297,838 B1 | 10/2001 | Chang et al. | 715/863 |
| 6,304,267 B1 | 10/2001 | Sata | 345/427 |
| 6,307,549 B1 | 10/2001 | King et al. | 715/810 |
| 6,307,568 B1 | 10/2001 | Rom | 345/629 |
| 6,323,839 B1 | 11/2001 | Fukuda et al. | 345/157 |
| 6,323,942 B1 | 11/2001 | Bamji | 356/5.01 |
| 6,326,901 B1 | 12/2001 | Gonzales | 340/7.2 |
| 6,327,073 B1 | 12/2001 | Yahav et al. | 359/321 |
| 6,331,911 B1 | 12/2001 | Manassen et al. | 359/260 |
| 6,346,929 B1 | 2/2002 | Fukushima et al. | 354/8 |
| 6,351,661 B1 | 2/2002 | Cosman | 600/426 |
| 6,371,849 B1 | 4/2002 | Togami | 463/4 |
| 6,392,644 B1 | 5/2002 | Miyata et al. | 345/419 |
| 6,394,897 B1 | 5/2002 | Togami | 463/4 |
| 6,400,374 B2 | 6/2002 | Lanier | 345/630 |
| 6,409,602 B1 | 6/2002 | Wiltshire et al. | 463/42 |
| 6,411,392 B1 | 6/2002 | Bender et al. | 358/1.14 |
| 6,411,744 B1 | 6/2002 | Edwards | 382/294 |
| 6,417,836 B1 | 7/2002 | Kumar et al. | 345/156 |
| 6,441,825 B1 | 8/2002 | Peters | 345/473 |
| 6,473,516 B1 | 10/2002 | Kawaguchi et al. | 382/100 |
| 6,498,860 B1 | 12/2002 | Sasaki et al. | 382/103 |
| 6,504,535 B1 | 1/2003 | Edmark | 345/419 |
| 6,516,466 B1 | 2/2003 | Jackson | 725/62 |
| 6,533,420 B1 | 3/2003 | Eichenlaub | 353/7 |
| 6,542,927 B2 | 4/2003 | Rhoads | 709/217 |
| 6,545,706 B1 | 4/2003 | Edwards et al. | 348/169 |
| 6,546,153 B1 | 4/2003 | Hoydal | 382/285 |
| 6,556,704 B1 | 4/2003 | Chen | 382/154 |
| 6,577,748 B2 | 6/2003 | Chang | 382/100 |
| 6,580,414 B1 | 6/2003 | Wergen et al. | 345/156 |
| 6,580,415 B1 | 6/2003 | Kato et al. | 345/156 |
| 6,587,573 B1 | 7/2003 | Stam et al. | 382/104 |
| 6,593,956 B1 | 7/2003 | Potts et al. | 348/14.09 |
| 6,621,938 B1 | 9/2003 | Tanaka et al. | 382/276 |
| 6,628,265 B2 | 9/2003 | Hwang | 345/156 |
| 6,661,914 B2 | 12/2003 | Dufour | 382/154 |
| 6,674,415 B2 | 1/2004 | Nakamura et al. | 345/32 |
| 6,676,522 B2 | 1/2004 | Rowe et al. | 463/42 |
| 6,677,967 B2 | 1/2004 | Sawano et al. | 715/839 |
| 6,677,987 B1 | 1/2004 | Girod | 348/171 |
| 6,709,108 B2 | 3/2004 | Levine et al. | 351/211 |
| 6,720,949 B1 | 4/2004 | Pryor et al. | 345/158 |
| 6,727,988 B2 | 4/2004 | Kim et al. | 356/319 |
| 6,741,741 B2 | 5/2004 | Farrell | 382/199 |
| 6,746,124 B2 | 6/2004 | Fischer et al. | 353/43 |
| 6,751,338 B1 | 6/2004 | Wallack | 382/106 |
| 6,753,849 B1 | 6/2004 | Curran et al. | 345/158 |
| 6,767,282 B2 | 7/2004 | Matsuyama et al. | 463/3 |
| 6,769,769 B2 | 8/2004 | Podoleanu et al. | 351/221 |
| 6,772,057 B2 | 8/2004 | Breed et al. | 701/45 |
| 6,774,939 B1 | 8/2004 | Peng | 348/231.4 |
| 6,785,329 B1 | 8/2004 | Pan et al. | 375/240.08 |
| 6,789,967 B1 | 9/2004 | Forester | 400/489 |
| 6,791,531 B1 | 9/2004 | Johnston et al. | 345/157 |
| 6,795,068 B1 | 9/2004 | Marks | 345/419 |
| 6,809,776 B1 | 10/2004 | Simpson et al. | 348/565 |
| 6,819,318 B1 | 11/2004 | Geng | 345/420 |
| 6,847,311 B2 | 1/2005 | Li | 341/28 |
| 6,863,609 B2 | 3/2005 | Okuda et al. | 463/36 |
| 6,881,147 B2 | 4/2005 | Naghi et al. | 463/35 |
| 6,884,171 B2 | 4/2005 | Eck et al. | 463/42 |
| 6,890,262 B2 | 5/2005 | Oishi et al. | 463/31 |
| 6,917,688 B2 | 7/2005 | Yu et al. | 381/94.7 |
| 6,919,824 B2 | 7/2005 | Lee | 341/20 |
| 6,924,787 B2 | 8/2005 | Kramer et al. | 345/156 |
| 6,928,180 B2 | 8/2005 | Stam et al. | 382/104 |
| 6,930,725 B1 | 8/2005 | Hayashi | 348/373 |
| 6,931,596 B2 | 8/2005 | Gutta et al. | 715/728 |
| 6,943,776 B2 | 9/2005 | Ehrenburg | 345/168 |
| 6,945,653 B2 | 9/2005 | Kobori et al. | 353/30 |
| 6,951,515 B2 | 10/2005 | Ohshima et al. | 463/31 |
| 6,952,198 B2 | 10/2005 | Hansen | 345/158 |
| 6,965,362 B1 | 11/2005 | Ishizuka | 345/82 |
| 6,970,183 B1 | 11/2005 | Monroe | 348/143 |
| 6,990,639 B2 | 1/2006 | Wilson | 715/863 |
| 7,006,009 B2 | 2/2006 | Newman | 340/854.5 |
| 7,016,411 B2 | 3/2006 | Azuma et al. | 375/240.08 |

| Patent No. | Date | Inventor | Class |
|---|---|---|---|
| 7,039,199 B2 | 5/2006 | Rui | 381/92 |
| 7,039,253 B2 | 5/2006 | Matsuoka et al. | 382/295 |
| 7,042,440 B2 | 5/2006 | Pryor et al. | 345/158 |
| 7,043,056 B2 | 5/2006 | Edwards et al. | 382/103 |
| 7,054,452 B2 | 5/2006 | Ukita | 381/92 |
| 7,059,962 B2 | 6/2006 | Watashiba | 463/2 |
| 7,061,507 B1 | 6/2006 | Tuomi et al. | 345/611 |
| 7,071,914 B1 | 7/2006 | Marks | 345/156 |
| 7,090,352 B2 | 8/2006 | Kobori et al. | 353/30 |
| 7,098,891 B1 | 8/2006 | Pryor | 345/158 |
| 7,102,615 B2 | 9/2006 | Marks | 345/156 |
| 7,106,366 B2 | 9/2006 | Parker et al. | 348/222.1 |
| 7,116,330 B2 | 10/2006 | Marshall et al. | 345/474 |
| 7,116,342 B2 | 10/2006 | Dengler et al. | 345/630 |
| 7,121,946 B2 | 10/2006 | Paul et al. | 463/36 |
| 7,139,767 B1 | 11/2006 | Taylor et al. | 707/102 |
| 7,148,922 B2 | 12/2006 | Shimada | 348/370 |
| 7,164,413 B2 | 1/2007 | Davis et al. | 345/163 |
| 7,183,929 B1 | 2/2007 | Antebi et al. | 340/573.1 |
| 7,212,308 B2 | 5/2007 | Morgan | 358/1.18 |
| 7,223,173 B2 | 5/2007 | Masuyama et al. | 463/36 |
| 7,224,384 B1 | 5/2007 | Iddan et al. | 348/207.99 |
| 7,227,526 B2 | 6/2007 | Hildreth et al. | 345/156 |
| 7,227,976 B1 | 6/2007 | Jung et al. | 382/103 |
| 7,245,273 B2 | 7/2007 | Eberl et al. | 351/211 |
| 7,259,375 B2 | 8/2007 | Tichit et al. | 250/341.8 |
| 7,263,462 B2 | 8/2007 | Funge et al. | 702/179 |
| 7,274,305 B1 | 9/2007 | Luttrell | 340/870.02 |
| 7,283,679 B2 | 10/2007 | Okada et al. | 382/260 |
| 7,296,007 B1 | 11/2007 | Funge et al. | 706/47 |
| 7,301,530 B2 | 11/2007 | Lee et al. | 345/158 |
| 7,305,114 B2 | 12/2007 | Wolff et al. | 709/200 |
| 7,346,387 B1 | 3/2008 | Wachter et al. | 600/476 |
| 7,352,359 B2 | 4/2008 | Zalewski et al. | 345/156 |
| 7,364,297 B2 | 4/2008 | Goldfain et al. | 351/206 |
| 7,379,559 B2 | 5/2008 | Wallace et al. | 382/100 |
| 7,391,409 B2 | 6/2008 | Zalewski et al. | 345/156 |
| 7,436,887 B2 | 10/2008 | Yeredor et al. | 375/240 |
| 7,446,650 B2 | 11/2008 | Scholfield et al. | 340/425.5 |
| 7,545,926 B2 | 6/2009 | Mao | 379/406.08 |
| 7,558,698 B2 | 7/2009 | Funge et al. | 702/179 |
| 7,594,847 B1 | 9/2009 | York et al. | |
| 7,613,610 B1 | 11/2009 | Zimmerman et al. | 704/235 |
| 7,623,115 B2 | 11/2009 | Marks | 345/156 |
| 7,627,139 B2 | 12/2009 | Marks et al. | 382/103 |
| 7,636,645 B1 | 12/2009 | Yen et al. | 702/152 |
| 7,697,700 B2 | 4/2010 | Mao | 381/94.3 |
| 7,721,231 B2 | 5/2010 | Wilson | 715/863 |
| 7,789,741 B1* | 9/2010 | Fields et al. | 463/2 |
| 2001/0056477 A1 | 12/2001 | McTernan et al. | 709/219 |
| 2002/0010655 A1 | 1/2002 | Kjallstrom | 705/27 |
| 2002/0056114 A1 | 5/2002 | Fillebrown et al. | 725/78 |
| 2002/0072414 A1 | 6/2002 | Stylinski et al. | 463/42 |
| 2002/0075286 A1 | 6/2002 | Yonezawa et al. | 345/679 |
| 2002/0083461 A1 | 6/2002 | Hutcheson et al. | 725/62 |
| 2002/0085097 A1 | 7/2002 | Colmenarez et al. | 348/211 |
| 2002/0094189 A1 | 7/2002 | Navab et al. | 386/4 |
| 2002/0126899 A1 | 9/2002 | Farrell | 382/199 |
| 2002/0134151 A1 | 9/2002 | Naruoka et al. | 73/291 |
| 2002/0158873 A1 | 10/2002 | Williamson | 345/427 |
| 2003/0014212 A1 | 1/2003 | Ralston et al. | 702/150 |
| 2003/0022716 A1 | 1/2003 | Park et al. | 463/36 |
| 2003/0093591 A1 | 5/2003 | Hohl | 710/22 |
| 2003/0100363 A1 | 5/2003 | Ali | 436/30 |
| 2003/0160862 A1 | 8/2003 | Charlier et al. | 348/14.08 |
| 2003/0232649 A1 | 12/2003 | Gizis et al. | 463/40 |
| 2004/0001082 A1 | 1/2004 | Said | 345/730 |
| 2004/0017355 A1 | 1/2004 | Shim | 345/157 |
| 2004/0063480 A1 | 4/2004 | Wang | 463/8 |
| 2004/0063481 A1 | 4/2004 | Wang | 463/8 |
| 2004/0070565 A1 | 4/2004 | Nayar et al. | 345/156 |
| 2004/0087366 A1 | 5/2004 | Shum et al. | 463/36 |
| 2004/0095327 A1 | 5/2004 | Lo | 345/169 |
| 2004/0140955 A1 | 7/2004 | Metz | 345/166 |
| 2004/0150728 A1 | 8/2004 | Ogino | 348/239 |
| 2004/0178576 A1 | 9/2004 | Hillis et al. | 273/148 |
| 2004/0213419 A1 | 10/2004 | Varma et al. | 381/92 |
| 2004/0227725 A1 | 11/2004 | Calarco et al. | 345/156 |
| 2004/0254017 A1 | 12/2004 | Cheng | 463/35 |
| 2005/0037844 A1 | 2/2005 | Shum et al. | 463/36 |
| 2005/0047611 A1 | 3/2005 | Mao | 381/94.7 |
| 2005/0088369 A1 | 4/2005 | Yoshioka | 345/60 |
| 2005/0102374 A1 | 5/2005 | Moragne et al. | 709/217 |
| 2005/0105777 A1 | 5/2005 | Koslowski et al. | 382/115 |
| 2005/0117045 A1 | 6/2005 | Abdellatif et al. | 384/335 |
| 2005/0198095 A1 | 9/2005 | Du et al. | 709/200 |
| 2005/0226431 A1 | 10/2005 | Mao | 381/61 |
| 2005/0239548 A1 | 10/2005 | Ueshima et al. | 463/36 |
| 2006/0033713 A1 | 2/2006 | Pryor | 345/158 |
| 2006/0035710 A1 | 2/2006 | Festejo et al. | 463/36 |
| 2006/0038819 A1 | 2/2006 | Festejo et al. | 345/530 |
| 2006/0204012 A1 | 9/2006 | Marks et al. | 381/26 |
| 2006/0233389 A1 | 10/2006 | Mao et al. | 381/92 |
| 2006/0252541 A1 | 11/2006 | Zalewski et al. | 463/156 |
| 2006/0256081 A1 | 11/2006 | Zalewski et al. | 345/156 |
| 2006/0264258 A1 | 11/2006 | Zalewski et al. | 463/36 |
| 2006/0264259 A1 | 11/2006 | Zalewski et al. | 463/36 |
| 2006/0264260 A1 | 11/2006 | Zalewski et al. | 463/36 |
| 2006/0269072 A1 | 11/2006 | Mao | 381/56 |
| 2006/0269073 A1 | 11/2006 | Mao | 381/56 |
| 2006/0274032 A1 | 12/2006 | Mao et al. | 345/156 |
| 2006/0274911 A1 | 12/2006 | Mao et al. | 381/334 |
| 2006/0280312 A1 | 12/2006 | Mao | 381/56 |
| 2006/0282873 A1 | 12/2006 | Zalewski et al. | 725/133 |
| 2006/0287084 A1 | 12/2006 | Mao et al. | 463/37 |
| 2006/0287085 A1 | 12/2006 | Mao et al. | 463/37 |
| 2006/0287086 A1 | 12/2006 | Zalewski et al. | 436/37 |
| 2006/0287087 A1 | 12/2006 | Zalewski et al. | 463/37 |
| 2007/0015559 A1 | 1/2007 | Zalewski et al. | 463/1 |
| 2007/0021208 A1 | 1/2007 | Mao et al. | 463/36 |
| 2007/0025562 A1 | 2/2007 | Zalewski et al. | 381/92 |
| 2007/0060336 A1 | 3/2007 | Marks et al. | 463/30 |
| 2007/0061413 A1 | 3/2007 | Larsen et al. | 709/217 |
| 2007/0066394 A1 | 3/2007 | Ikeda et al. | 463/37 |
| 2007/0072675 A1 | 3/2007 | Hammano et al. | 463/42 |
| 2007/0120834 A1 | 5/2007 | Boillot | 354/103 |
| 2007/0120996 A1 | 5/2007 | Boillot | 384/345 |
| 2007/0260340 A1 | 11/2007 | Mao | 700/94 |
| 2007/0260517 A1 | 11/2007 | Zalewski et al. | 705/14 |
| 2007/0261077 A1 | 11/2007 | Zalewski et al. | 725/35 |
| 2008/0056561 A1 | 3/2008 | Sawachi | 382/154 |
| 2008/0070684 A1 | 3/2008 | Haigh-Hutchinson | 463/32 |
| 2008/0091421 A1 | 4/2008 | Gustavsson | 704/233 |
| 2009/0010494 A1 | 1/2009 | Bechtel et al. | 382/104 |
| 2009/0016642 A1 | 1/2009 | Hart | 382/278 |
| 2009/0197686 A1* | 8/2009 | Bergelt et al. | 463/43 |
| 2009/0221368 A1 | 9/2009 | Yen et al. | 463/32 |
| 2009/0221374 A1 | 9/2009 | Yen et al. | 463/42 |
| 2009/0288064 A1 | 11/2009 | Yen et al. | 717/106 |
| 2010/0004896 A1 | 1/2010 | Yen et al. | 702/153 |
| 2010/0137064 A1 | 6/2010 | Shum et al. | 463/36 |

FOREIGN PATENT DOCUMENTS

| | | |
|---|---|---|
| EP | 0652686 | 5/1995 |
| EP | 0750202 | 12/1996 |
| EP | 0835676 | 4/1998 |
| EP | 1098686 | 5/2003 |
| EP | 1435258 | 7/2004 |
| FR | 2814965 | 4/2002 |
| GB | 2206716 | 1/1989 |
| GB | 2206716 | 11/1989 |
| GB | 2376397 | 11/2002 |
| GB | 2388418 | 11/2003 |
| JP | 01-284897 | 11/1989 |
| JP | 06-102980 | 4/1994 |
| JP | 07-311568 | 11/1995 |
| JP | 9-128141 | 5/1997 |
| JP | 9-185456 | 7/1997 |
| JP | 11-38949 | 2/1999 |
| JP | 2000-172431 | 6/2000 |
| JP | 2000259856 | 9/2000 |
| JP | 2000350859 | 12/2000 |
| JP | 2001-166676 | 6/2001 |
| JP | 2002369969 | 12/2002 |
| JP | 2004-145448 | 5/2004 |
| JP | 2004145448 | 5/2004 |
| JP | 2005-046422 | 2/2005 |
| WO | WO 88/05942 | 8/1988 |

| WO | WO 98/48571 | 10/1998 |
| WO | WO 99/35633 | 7/1999 |
| WO | WO 99/26198 | 10/1999 |
| WO | WO 02/27456 | 2/2002 |
| WO | WO 03/079179 | 9/2003 |
| WO | WO 2005/073838 | 8/2005 |
| WO | WO 2005107911 | 11/2005 |
| WO | WO 2007095082 | 8/2007 |
| WO | WO 2008/056180 | 5/2008 |

OTHER PUBLICATIONS

K. B. Shimoga, et al., "Touch and Force Reflection for Telepresence Surgery", Engineering in Medicine and Biology Opportunities of the IEEEE, Baltimore, MD, USA, Nov. 3, 1994, New York, New York, USA, pp. 1049-1050.

Iddan, et al., "3D Imaging in the Studio (And Elsewhere . . . )", Proceedings of the SPIE, SPIE, Bellingham, VA, US, vol. 4298, Jan. 24, 2001, pp. 48-55, XP008005351.

Jojic, et al., "Tracking Self-Occluding Articulated Objects in Dense Disparity Maps", Computer Vision, 1999, The Proceedings fo the Seventh IEEE International Conference on Kerkyra, Greece Sep. 20-27, 1999, Los Alamitos, CA, US, IEEE Computer Society, US, Sep. 20, 1999, pp. 123-130.

Klinker, et al., "Distributed User Tracking Concepts for Augmented Reality Applications", pp. 37-44, Augmented Reality, 2000, IEEE and ACM Int'l Symposium, Oct. 2000, XP010520308, ISBN: 0-7695-0846-4, Germany.

Nakagawa, et al., "A Collision Detection and Motion Image Synthesis Between a Background Image and a Foreground 3-Dimensional Object", TVRSJ Bol. 4, No. 2, pp. 425-430, 1999, Japan.

Mihara, et al., "A Realtime Vision-Based Interface Using Motion Processor and Applications to Robotics", vol. J84-D-11, No. 9, pp. 2070-2078, Sep. 2001, Japan.

Nakamura, et al., "A Consideration on Reconstructing 3-D Model Using Object Views", 2004-01601-003, pp. 17-21, Kokkaido University, Japan, nakamura@media.eng.hokudai.ac.jp.

Nishida, et al., "A Method of Estimating Human Shapes by Fitting the Standard Human Model to Partial Measured Data", D-II vol. J84-D-II, No. 7, pp. 1310-1318, Jul. 2001.

Wilson & Darrell, "Audio-Video Array Source Localization for Intelligent Environments", 2002 IEEE Dept. of Electrical Eng and Computer Science, MIT, Cambridge, MA 02139.

Fiala, et al., "A Panoramic Video and Acoustic Beamforming Sensor for Videoconferencing", 2004 IEEE, Computational Video Group, National Research Council, Ottawa, Canada K1A 0R6.

Hemmi, et al., "3-D Natural Interactive Interface-Using Marker Tracking from a Single View",Sep. 9, 1991, Systems and Computers in Japan.

Lanier, Jaron, "Virtually there: three-dimensional tele-immersion may eventually bring the world to your desk", Scientific American, ISSN: 0036-8733, Year: 2001.

Richardson et al., "Virtual Network Computing" IEEE Internet Computing, vol. 2,No. 1 Jan./Feb. 1998.

Fujitsu, "Internet Development of Emulators" Abstract, Mar. 1997, vol. 48, No. 2.

Kanade, et al., "A Stereo Machine for Video-rate Dense Depth Mapping and Its New Application" 1996, CVPR 96, IEEE Computer Society Conference, pp. 196-202 (022).

Gvili, et al., "Depth Keying", SPIE vol. 5006 (2003), 2003 SPIE-IS &T, pp. 564-574 (031).

Ephraim et al. "Speech Enhancement Using a Minimum Mean-Square Error Log-Spectral Amplitude Estimator", 1985, IEEE.

Ephraim et al. "Speech Enhancement Using a Minimum Mean-Square Error Short-Time Spectral Amplitude Estimator", 1984, IEEE.

Richardson et al. "Virtual Network Computing", 1998, IEEE Internet Computing vol. 2.

XP-002453974, "CFS and FS95/98/2000: How to Use the Trim Controls to Keep Your Aircraft Level", Aug. 10, 2007, http://support.microsoft.com/?scid=kb%3Ben-us%3B175195&x=13&y=15.

* cited by examiner

METHODS AND SYSTEMS FOR ENABLING CONTROL OF ARTIFICIAL INTELLIGENCE GAME CHARACTERS

BACKGROUND

Modern video games continue to grow in depth and complexity. As is well known, a game console (such as the Sony Playstation 3 (PS3)) is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical media drive for receiving optical media for local play through the game console. Online gaming is also possible, where a user can interactively play against or with other users over the Internet.

In a typical video game, a player directly controls a first-person character's actions, which may include movements and/or other activities such as firing a weapon. In other words, a player's inputs to the controllers are immediately transformed into actions taken by the first-person character in the video game. However, in more complex video games the first-person character may play alongside a number of artificial-intelligence (AI) characters, which may represent teammates or characters which are otherwise on the first-person character's side.

The actions of AI characters are typically automatically controlled by the game itself, and behave according to preset algorithms which are designed to generally provide actions which are beneficial to the first-person character. Thus, for example, in a battlefield-style game, AI characters will generally move about and engage enemy characters in combat. However, some video games have provided interfaces which enable a player to provide a certain amount of control over the actions of AI characters. Yet these prior art methods for controlling AI characters have been unintuitive and cumbersome to use, often presenting limited options to the player and removing him from the immersive experience of the gameplay in order to present an interface for providing commands for the AI characters.

In view of the foregoing, there is a need for methods and systems that enable more advanced control of AI characters in a game. It is in this context that embodiments of the invention arise.

SUMMARY OF THE INVENTION

Broadly speaking, the present invention fills these needs by providing an apparatus and method that facilitates control of AI characters in a video game. In one embodiment, a method for controlling an artificial-intelligence (AI) character comprises entering a command mode. The command mode enables control of the AI character, and occurs while substantially maintaining an existing display of the game, thereby preserving the immersive experience of the video game for the player. A plurality of locations are sequentially specified within a virtual space of the game, the plurality of locations defining a path for the AI character. Finally, the AI character is moved along the path to the plurality of locations in the order they were specified.

In another embodiment, the plurality of locations is specified by maneuvering a reticle to each of the locations. Each of the plurality of locations is thereby selected when the reticle is situated at each of the plurality of locations.

In one embodiment, a node is displayed in the existing display of the game at each of the plurality of locations. The node thus indicates to the player locations which have been specified for the AI character to travel to. In one embodiment, a series of lines connecting the nodes is displayed in the existing display of the game, thus illustrating the path that the AI character may take in moving to each of the plurality of locations.

In another embodiment, a field of view of the display of the game is shifted in accordance with the maneuvering of the reticle, so as to maintain a display of the reticle in a central portion of the field of view. In this manner, the field of view tracks the reticle as the player maneuvers the reticle to the plurality of locations.

In one embodiment, a rate of gameplay of the game is slowed when the command mode is engaged. By slowing the rate of gameplay, the player is given time to specify the plurality of locations for the AI character, while still maintaining the experience of the gameplay to a substantial degree, thereby simulating a heightened sense of awareness.

In one embodiment, another method of altering the gameplay while preserving the immersive experience for the player is provided. When the command mode is entered, points of interest within the display of the game are determined. Then the color saturation of the display of the game is reduced while maintaining the color saturation of the points of interest. This has the effect of highlighting the points of interest to the player. In various embodiments, the points of interest may include such objects as character, gun-fire, and explosions.

In another embodiment, when the command mode is entered, a field of view of the existing display of the game is enlarged. This provides the player with a greater scope of the spatial field of the game, enabling a player to make more informed decisions regarding the specification of locations for the AI character.

In one embodiment, an action may be specified to be performed by the AI character at one or more of the plurality of locations. In various embodiments, the actions may include attacking an enemy character and destroying an object.

In one embodiment, the gameplay functions such that the AI characters begin moving immediately upon specification of a first one of the plurality of locations. In another embodiment, existing movement of the AI character is halted prior to the specifying of the plurality of locations. Then, after the plurality of locations have been specified, the AI character is released to follow the path.

In one embodiment of the invention, a computer system is provided for executing a game which includes an artificial-intelligence (AI) character. The system comprises a controller for receiving and relaying user input to the game, a display for displaying image frame data of the game, and a command mode processor for executing a command mode of the game. The command mode enables control of the AI character and execution of the command mode occurs while substantially maintaining an existing display of the game. The command mode processor comprises a node placement module for enabling a user to specify a plurality of locations within a virtual space of the game, and the plurality of locations defines a path for the AI character.

In one embodiment, the command mode processor is configured to provide a command reticle to the user. The specification of the plurality of locations is facilitated by enabling the user to maneuver the command reticle to each of the plurality of locations and selecting each of the plurality of locations when the reticle is situated at each of the plurality of locations.

In one embodiment, the node placement module is configured to display a node in the existing display of the game at each of the plurality of locations, thereby providing a visual indication of the locations selected. In one embodiment, the specification of the plurality of locations further includes displaying a series of lines connecting the nodes in the existing display of the game.

In one embodiment, as the reticle is maneuvered, a field of view of the display of the game is shifted in accordance with the maneuvering of the reticle, so as to maintain a display of the reticle in a central portion of the field of view. Thus, the display presented to the user tracks the movement of the reticle to facilitate more precise specification of the plurality of locations.

In another embodiment, the command mode processor further comprises a gameplay rate control module for slowing a rate of gameplay of the game during execution of the command mode. In one embodiment, the command node processor further comprises a saturation display control, the saturation display control for determining points of interest within the display of the game and reducing color saturation of the display of the game while maintaining color saturation of the points of interest. In another embodiment, the points of interest are selected from the group consisting of characters, gunfire, and explosions.

In one embodiment, when the command mode is executed, a field of view of the existing display of the game is enlarged, this providing to the user the effect of pulling back to enable the user to take in a greater scope of the game.

In another embodiment, the node placement module further enables a user to specify an action to be performed by the AI character at one or more of the plurality of locations.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to obscure the present invention.

Broadly speaking, the invention defines systems and methods for enabling a player of a video game to control artificial-intelligence (AI) characters. A command mode is defined which enables the player to access controls for determining actions for the AI characters. In accordance with an aspect of the invention, the command mode is executed while preserving for the player the immersive experience of the normal gameplay of the video game. While in the command mode, the player may specify locations which are visually represented by nodes. The locations specified define one or more paths for the AI characters to traverse.

Figure 1:
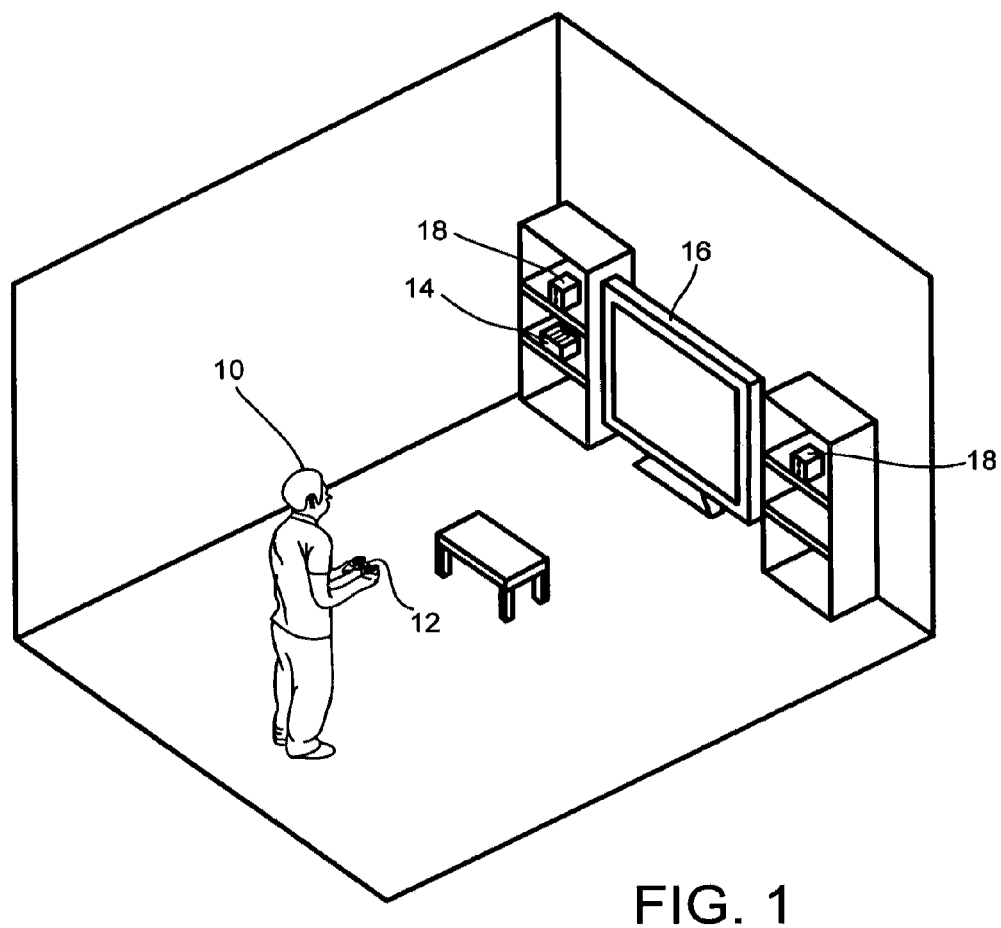
FIG. 1 illustrates a generic video game system, in which methods of the present invention may be embodied.

With reference to FIG. 1, a generic video game system is depicted, in which the methods of the present invention may be implemented. A player 10 provides inputs via an input device 12. The input device 12 may be any device or combination of devices as is known in the art for providing inputs for a video game. Examples of such devices include a joystick, keyboard, mouse, trackball, touch sensitive pad, and dedicated game controllers such as the DUALSHOCK® 3 Wireless Controller manufactured by Sony Computer Entertainment Inc. The input device 12 transmits inputs to a computer 14. The computer 14 may be any device as is known in the art which is suitable for executing a video game. Various examples of such suitable devices include personal computers, laptops, handheld computing devices, and dedicated gaming consoles such as the Sony Playstation® 3. Other examples of game consoles include those manufactured by Sony Computer Entertainment, Inc., Nintendo, and Microsoft. The computer 14 outputs video to a display 16, such as a monitor or television, and outputs audio to speakers 18, which may be loudspeakers (e.g. stand-alone or those built into a television or monitor) or headphones.

With reference to FIGS. 2A-2D, a method for controlling AI characters is shown. A view 100 represents a field of view of a three-dimensional virtual spatial field of a video game, as would be seen by a player of the video game. The view 100 as shown in FIGS. 2A-2D is thus typically projected onto a two-dimensional display such as a television or computer monitor display. In other embodiments, the view 100 may be projected onto a three-dimensional display, such as a holographic projection. The virtual spatial field of the video game is generally a three-dimensional space. But in other embodiments, the virtual spatial field of the video game shown by view 100 may be a two-dimensional space.

Figure 2A:
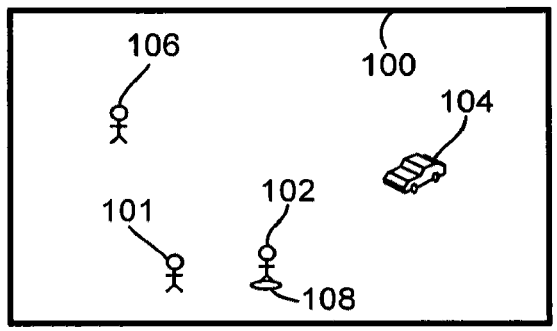
FIGS. 2A-2D illustrate views of a video game which demonstrate a method for controlling AI characters, in accordance with an embodiment of the invention.

With reference to FIG. 2A, an AI character 102 is shown in the view 100, along with a player's first-person character 101. The player controls the first-person character 101 in real-time. That is, inputs provided by the player directly and immediately affect the actions of the first-person character during real-time gameplay. For example, a player may control the movements of the first-person character 101, or cause the first-person character 101 to perform certain actions, such as firing a weapon. The first-person character 101 generally does not take any action until the player provides a direct input which causes the first-person character to act. In contrast, the AI character 102 is generally under automatic control of the video game. As such, the AI character 102 behaves according to preset algorithms of the video game, these being generally designed so that the AI character acts in a manner beneficial to the first-person character 101, or otherwise beneficial to the player's interests within the context of the video game. Thus, for example, in a battlefield-style game, the AI character 102 may approximately follow the player's first person character 101, and may engage and attack enemy characters. The AI character 102 may also carry out objectives which are beneficial to the player's interests, such as destroying enemy installations. However, these activities are controlled by preset algorithms of the video game, and may not reflect the actual desires or intent of the player. Therefore, it is beneficial to provide a method for a player to control the AI character 102.

With continued reference to FIGS. 2A-D, and in accordance with an embodiment of the invention, such a method for enabling a player to control the AI character 102 is herein described. As shown at FIG. 2A, a player is enabled to place a first node 108 within the view 100. The first node 108 represents a first location for the AI character 102. If the AI character is not located at node 108, then the AI character's first movement will be to move to the node 108.

Figure 2B:
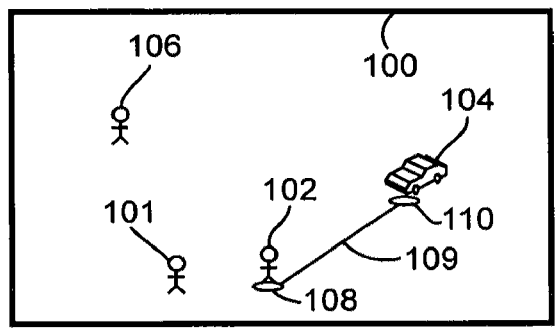

With reference to FIG. 2B, a second node 110 is placed at a vehicle 104. The second node 110 represents a second location for the AI character 102 to travel to. The second node 110 is connected to the first node 108 by a line 109, which provides a visual indication of the approximate path that the AI character 102 will take when moving from node 108 to node 110.

Figure 2C:
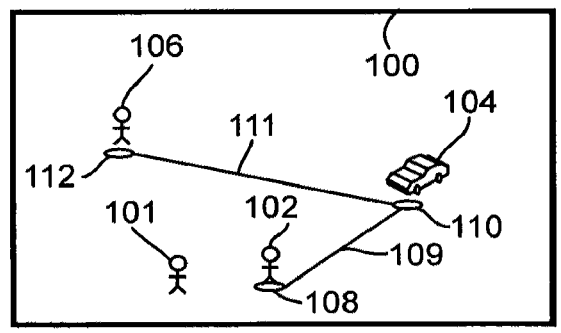

With reference to FIG. 2C, a third node 112 is placed at an enemy character 106, the third node 112 indicating a third location for the AI character 102. The third node 112 is connected to the second node 110 by line 111, which provides a visual indication of the approximate path that the AI character 102 will take when moving from node 110 to node 112.

Figure 2D:
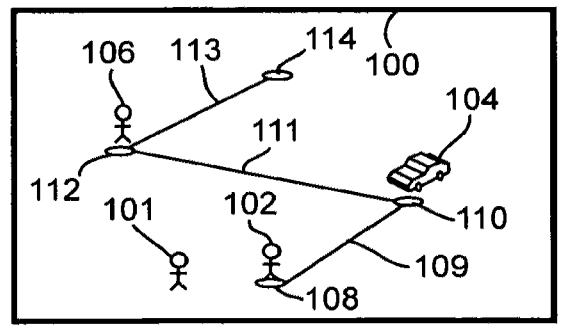

With reference to FIG. 2D, a fourth node 114 is placed in the field of view 100, the fourth node 114 indicating a fourth location for the AI character 102. The fourth node 114 is connected to the third node 112 by line 113, which provides a visual indication of the approximate path that the AI character 102 will take when moving from node 112 to node 114.

In one embodiment, the view 100 as shown in FIGS. 2A-D as projected onto a display 16 represents an existing display of the game. In other words, the look and feel of the normal gameplay is substantially preserved, while simultaneously enabling a player to specify locations for the AI character 102 which are represented by nodes 108, 110, 112, and 114. Because a player is enabled to place the nodes 108, 110, 112, and 114 while substantially maintaining an existing display of the video game, a player is not removed from the immersive experience of the video game. The presently described method thus provides an intuitive method for controlling an AI character in a seamless manner in the context of the gameplay. For example, in a battlefield-style game utilizing the presently described method, then a player would not be required to "leave" the battlefield arena in order to set up commands for an AI character. Rather, the player could specify the commands within the context of the battlefield by simply placing nodes on the battlefield which indicate locations for the AI character to traverse.

The plurality of locations represented by nodes 108, 110, 112, and 114 collectively define a path for the AI character 102. As shown in FIGS. 2A-D, the nodes are disc-shaped. However, in other embodiments, the nodes may be any of various other shapes, such as a polygon, star, asterisk, etc. In one embodiment, the shape may vary according to the location of the node. For example, if a node is placed at an enemy character, the node may have a different shape than if it were placed in a generic location, thereby indicating to the player the presence of the enemy character. In another embodiment, the color of the node may vary depending upon the location represented by the node. Additionally, the shape and color of the lines 109, 111, and 113 may vary, provided they indicate an approximate path for the AI character 102 when traveling between nodes.

In one embodiment, a player may have the option of providing additional commands for the AI character to perform during placement of the nodes. These commands may enable a player to affect how an AI character interacts with its environment when traversing the various nodes. For example, when node 110 is placed at the vehicle 104, the player may have the option of commanding the AI character to destroy the vehicle. This may be indicated at the node 110 by an emblem such as a grenade symbol. In another example, when node 112 is placed at enemy character 106, the player may have the option of commanding the AI character to attack the enemy character 106. This may be indicated at the node 112 by an emblem such as a skull-and-crossbones. In one alternative embodiment, actions for an AI character to perform are automatically determined based upon the placement of a node. For example, placement of a node in the near vicinity of an enemy character may automatically cause the AI character to attack the enemy character when the AI character traverses the nodes and approaches the enemy character.

In accordance with an embodiment of the invention, the method illustrated in FIGS. 2A-2D as discussed above may comprise a separate command mode of the video game. The command mode may be triggered by providing an input from the controller, such as a button or sequence or combination of buttons. The command mode enables a player to provide command/control data to affect the movements and actions of AI characters, as described above. As mentioned above, the command mode of the video game is executed while maintaining an existing display of the game. This allows a player to continue to experience the immersive environment of the video game, and facilitates the specification of locations within the spatial field of the game in a natural and intuitive manner as described above.

A player is not required to navigate additional menus to place nodes for the AI characters, nor is the player presented with an additional interface display such as a schematic map. In accordance with the presently described methods, a player can intuitively reference the existing display of the game to specify locations which determine a path for an AI character. However, it may also be desirable to provide methods for distinguishing the command mode from a normal gameplay mode of the video game. To this end, in various embodiments, different methods of distinguishing the command mode from the normal gameplay mode while still substantially maintaining the existing display of the game are herein described.

In one embodiment, triggering the command mode causes a desaturation process to be performed on the existing display of the game. According to the desaturation process, points of interest within the spatial field of the game are identified. The points of interest may be objects such as persons, vehicles, weapons fire, explosions, or any other object that may be of interest to the player. Then the color saturation of the display of the game is desaturated while maintaining the color saturation of the points of interest. In this manner, all portions of the display that are not points of interest may appear in partial or full grayscale, while the points of interest appear highlighted to the player by virtue of their color.

In another embodiment, entering the command mode causes a time-slowing effect. In other words, the gameplay clock is slowed when in the command mode, such that the activity of the game proceeds at a slower rate than normal. This allows for the time required for a player to place nodes for an AI character, while still maintaining a sense of the continuity of the game. Thus, a player continues to experience the time-sensitive aspects of the game, but at a slowed rate that helps facilitate use of the presently described methods for controlling an AI character.

In a further embodiment, triggering the command mode causes an initial zoom-out of the field of view. By zooming out the field of view, a player is enabled to survey a larger portion of the spatial field of the game at once. This can be helpful in facilitating strategic placement of nodes for an AI character, as the player is thereby provided with more information regarding the state of the game. Enlarging the field of view conveys a greater sense of awareness of the geography, objects, characters, and events occurring within the spatial field of the game.

In various embodiments, the activity of the AI character 102 may be controlled in different ways relative to the execution of the command mode. In one embodiment, a player may halt the activity (such as movements) of the AI character 102 prior to or upon entering the command mode. While the AI character is halted, the player proceeds to specify a series of locations indicated by nodes, as described above, which define a path for the AI character 102. The AI character 102 remains in a halted configuration until released by the player. When released, the AI character begins to follow the path defined by the series of locations, in the order that the series of locations was specified.

In another embodiment, the AI character 102 is not halted prior to or upon entering the command mode. In such an embodiment, the AI character 102 continues its activity until a first location is specified, in accordance with the above-described methods. As soon as the first location is specified, then the AI character immediately begins moving to the first location. Upon reaching the first location, the AI character will automatically proceed to additional locations, if they have been specified, without delay.

It will be understood from the present specification that the presently-described methods for controlling an AI character may utilize various input devices and input methods and configurations, as described previously with reference to the video game system of FIG. 1. Actions such as triggering the command mode, specifying locations, and halting and/or releasing an AI character, all require that a player provide the necessary inputs. Thus, the inputs may result from any of various key strokes, buttons, button combinations, joystick movements, etc., all of which are suitable for providing inputs to a video game.

Figure 3A:
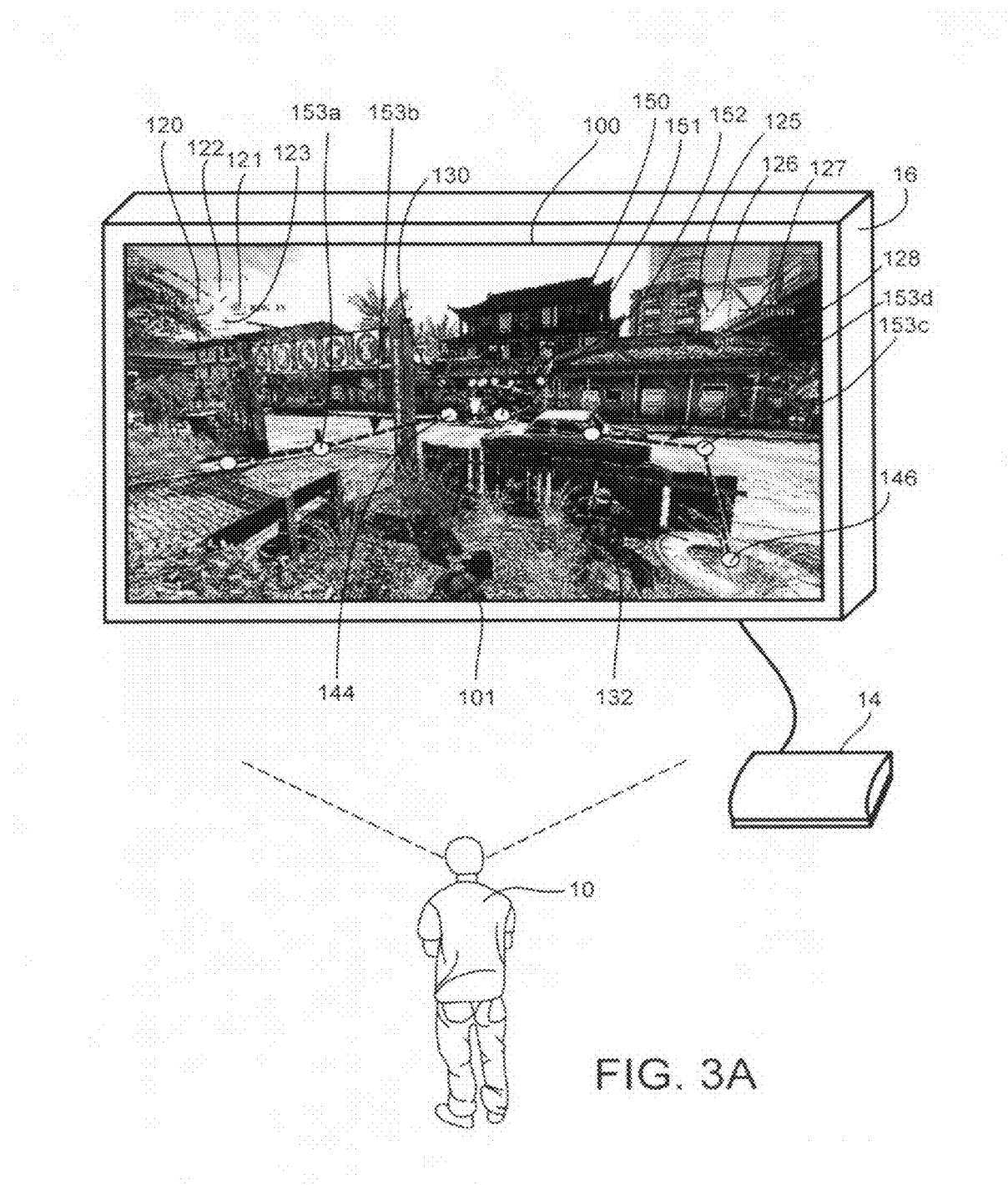
FIGS. 3A illustrates a view of a video game, demonstrating a command mode of the video game, in accordance with an embodiment of the invention.

With reference to FIG. 3A, a command mode of a video game is illustrated in a view 100, in accordance with an embodiment of the invention. This first-person character 101 is directly controlled by the player during real-time gameplay. Additionally, AI characters 132 accompany the first-person character 101. The AI characters are organized into teams, such that AI characters 132 form a first team, and form a second team. A player may control a team of AI characters in a group-wise fashion, such that a single command is operative to control the entire team.

With continued reference to FIG. 3A, the command mode shown in the view 100 includes various features to aid the player in specifying locations and actions for the AI characters. For example, a command reticle 130 indicates to the player where a node indicating a location for an AI character might be placed. Thus, in order to place nodes, the player maneuvers the command reticle 130 (e.g. via a joystick) to various locations in the view, and selects those locations in order to place a node. In one embodiment, the view 100 is shifted in accordance with the maneuvering of the command reticle 130, such that the command reticle 130 remains in the central portion of the view 100. In other words, when the command reticle 130 is being maneuvered in the command mode, the video game assumes a first-person characteristic based on the perspective of the command reticle 130, such that the view 100 is shifted in accordance with the movement of the command reticle 130.

In another embodiment, the view 100 generally does not shift when the command reticle 130 is maneuvered within the boundaries of the current view 100. However, when an attempt is made to maneuver the command reticle beyond the boundaries of the view 100, then the view 100 is adjusted accordingly (e.g. panning the field of view), so as to maintain the command reticle in the view 100.

With continued reference to FIG. 3A, icons 120, 121, 122, and 123 are shown in the upper left corner of the view 100; whereas icons 125, 126, 127, and 128 are shown in the upper right corner of the view 100. These icons represent game controller buttons, and are provided as an aid to the player, indicating the functionality of various buttons on a game controller. In one embodiment, the icons 120, 121, 122, and 123 correspond to the left, right, up, and down buttons of a directional pad, respectively. In one embodiment, the icon 120 indicates to the player that the left button of the directional pad is utilized to place a node for the first team (comprised of AI characters 132); whereas the icon 121 indicates to the player that the right button of the directional pad is utilized to place a node for the second team.

Such utility may be indicated in various ways, such as by providing descriptive words, or by providing a pattern, color, or symbol for each icon which corresponds to a pattern, color, or symbol provided for the AI characters of the relevant team. In one embodiment, the icon 122 indicates to the player that the up button of the directional pad is utilized to place a node for all of the AI characters 132 simultaneously. In one embodiment, the icon 123 indicates to the player that the down button of the directional pad is utilized to cancel a previously placed node.

The icons 125, 126, 127 and 128 may indicate additional functionality of buttons on a controller to the player. For example, in one embodiment, the icon 128 indicates to the player that the corresponding button having an "X"-shaped symbol is utilized to halt the activity of the AI characters and place them in a waiting state and/or release them from such a waiting state.

With continued reference to FIG. 3A, a series of nodes and connecting lines are shown, which collectively define paths for the AI characters 132. Nodes 153a and 144 represent specified locations for the first team. These specified locations define a path for the first team, which is indicated by lines 153b. In one embodiment, the nodes 153a and 144 and/or the lines 153b indicate their correspondence to the first team by having an associated color/pattern/symbol which corresponds to a color/pattern/symbol associated with the AI characters of the first team. Nodes 146 and 153c represent specified locations for the second team. These specified locations define a path for the second team, which is indicated by lines 153d.

In one embodiment, the nodes 146 and 153c and/or the lines 153d indicate their correspondence to the second team by having an associated color/pattern/symbol which corresponds to a color/pattern/symbol associated with the AI characters of the second team. Nodes 150 and 152 represent specified locations for all of the AI characters (both the first team and the second team). Thus, they define a path for all of the AI characters indicated by line 151. The paths of the first and second teams intersect at node 150.

Still with reference to FIG. 3A, a view 100 of a command mode of a video game is shown, in accordance with an embodiment of the invention. The view 100 is shown on a display, 16, which is connected to a game computer 14, and viewed by a player 10. The player 10's first-person character 101 is displayed in the lower center portion of the view 100. As illustrated, the various identifying features of the command mode are overlaid on the existing display of the game in an intuitive manner to facilitate ease of use and understanding regarding their purpose and implementation. The player 10 provides command/control data for two teams of AI characters by maneuvering the command reticle 130 and specifying locations for each of the teams to traverse. Exemplary specified locations for each of the teams are shown at nodes 153a and 153c. Various nodes are connected by lines indicating a path for the AI characters to navigate. Exemplary connecting lines for each of the teams are shown at 153b and 153d.

Figure 3B:
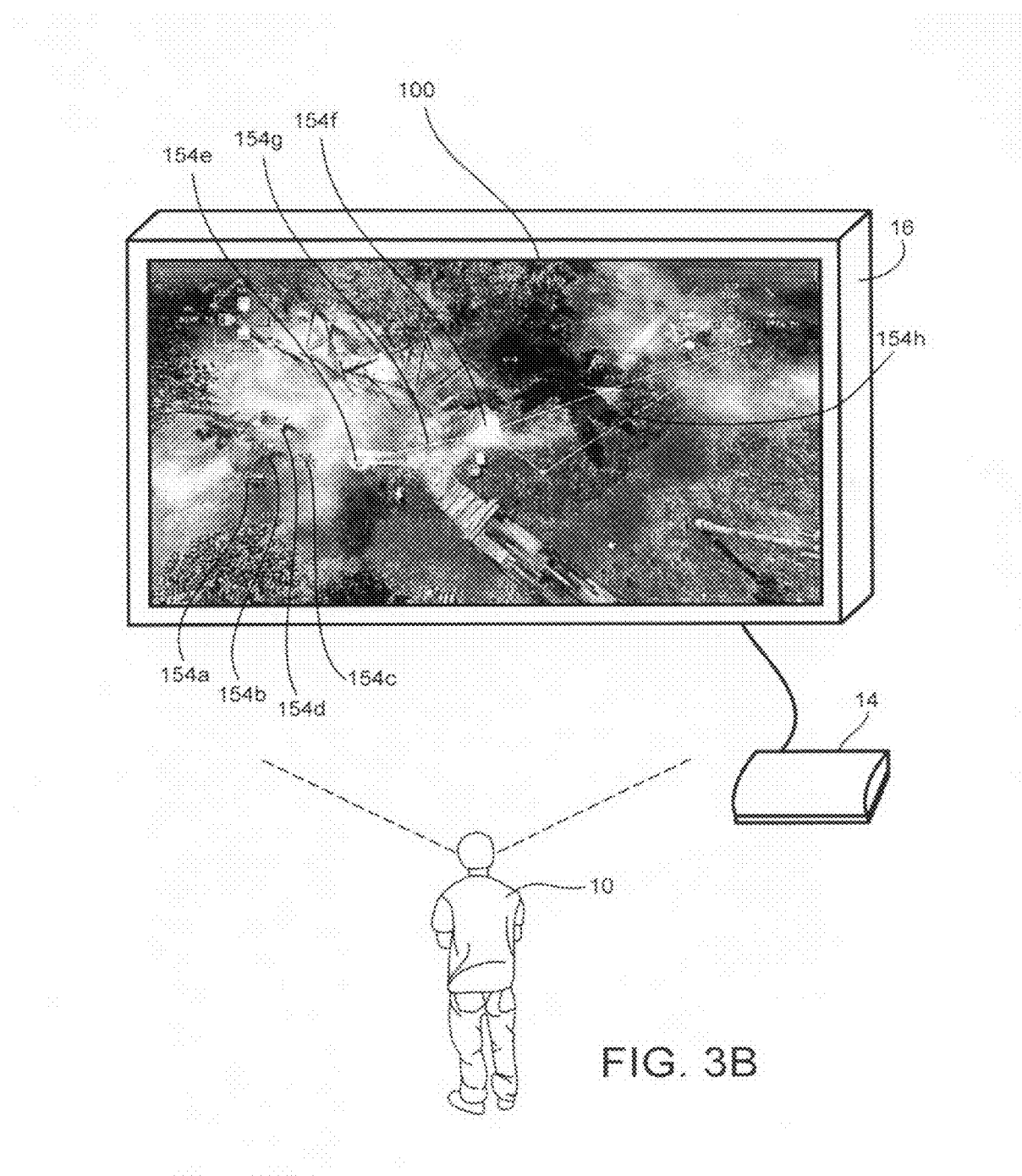
FIG. 3B illustrates a view of a video game, demonstrating a command mode of the video game, in accordance with an embodiment of the invention.

With reference to FIG. 3B, a view 100 of a video game is shown, in accordance with an embodiment of the invention. The view 100 is shown on a display, 16, which is connected to a game computer 14, and viewed by a player 10. The view 100 as shown is an overhead view of a scene of the video game, illustrating a command mode of the video game. AI characters 154a and 154b form a first team, while AI characters 154c and 154d form a second team. The AI characters of each team may be distinguished from each other by indicators such as associated shapes, markings and/or colors. The node 154e represents a first position for the first team, and is therefore highlighted by a segmented ring-shaped structure surrounding the node having the same color as the first team. The node 154f represents a first position for the second team, and is likewise therefore highlighted by a segmented ring-shaped structure. The node 154f also represents a second position for the first team. Because node 154f is a position for both the first and second teams, the node 154f is highlighted in a color different than that of the first or second teams, thus indicating its multi-team significance. Lines 154g and 154h connect the nodes of the first and second teams, respectively, and indicate the path defined by the nodes for each of the teams, respectively.

Figure 3C:
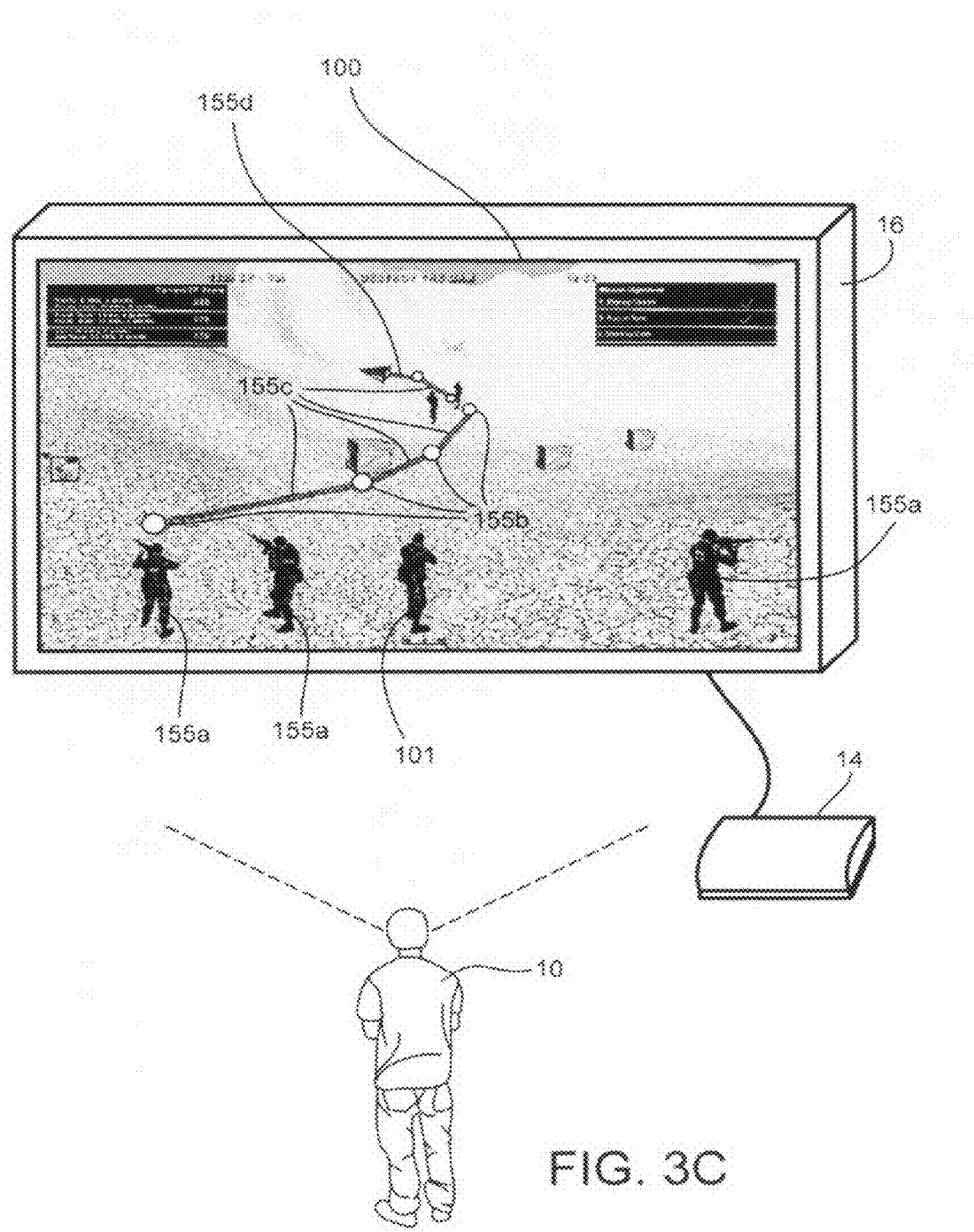
FIG. 3C illustrates a view of a video game, demonstrating a command mode of the video game, in accordance with an embodiment of the invention.

With reference to FIG. 3C, a view 100 of a video game illustrating a command mode of the video game is shown, in accordance with an embodiment of the invention. The view 100 is shown on a display, 16, which is connected to a game computer 14, and viewed by a player 10. A player's first-person character 101 is shown, along with AI characters 155a, which the player controls. Nodes 155b have been specified by the player, and define a path for the AI characters to traverse, which is indicated by connecting lines 155c. The last line segment 155d of the path is terminated by an arrow indicating the continuing direction that the AI characters will travel after completing traversal of the nodes 155b. In accordance with the embodiment shown, a player may be enabled to specify a direction of travel for the AI characters. The direction of travel may be specified after specification of a location as indicated by a node, or the direction of travel may be specified independently.

Figure 3D:
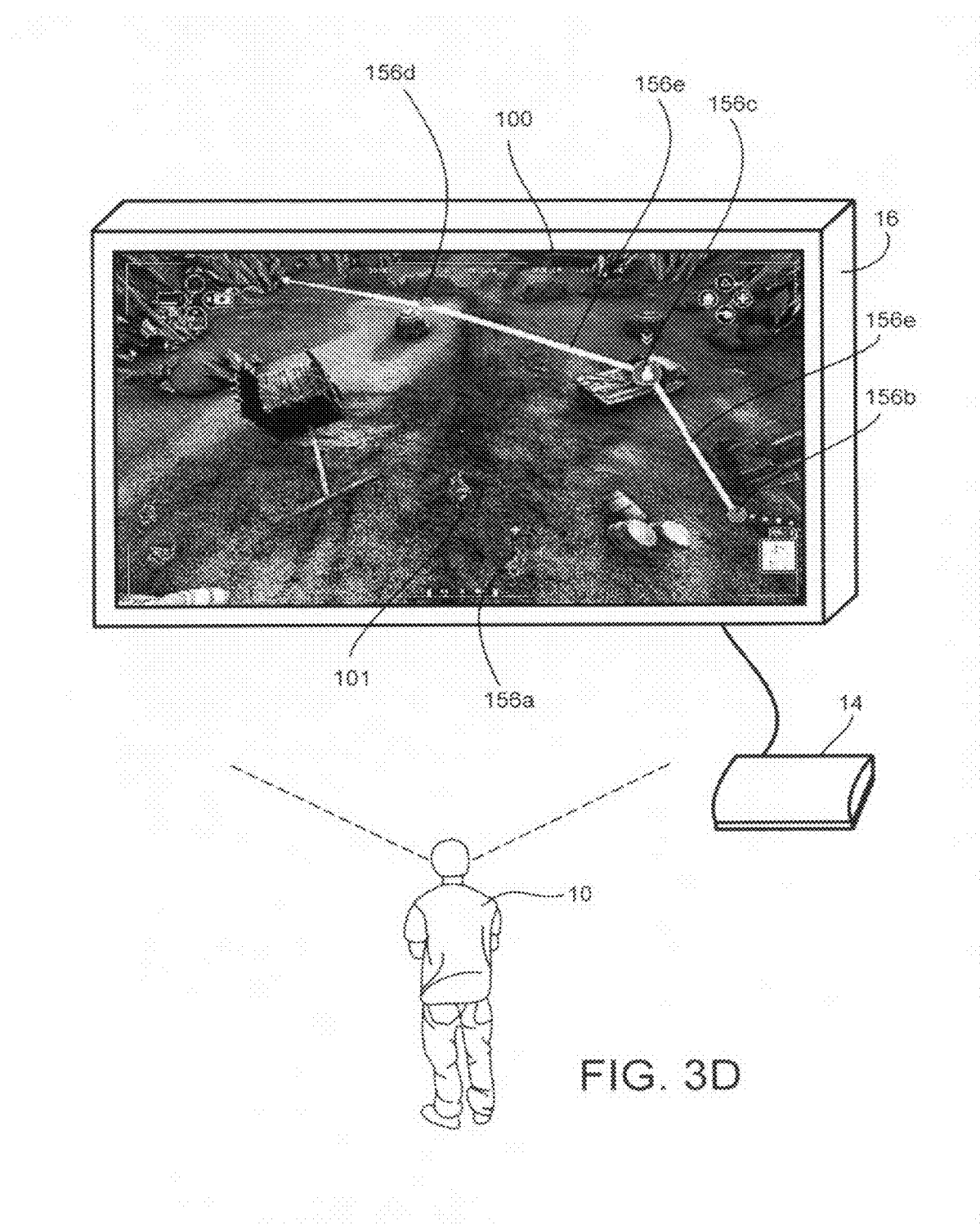
FIG. 3D illustrates a view of a video game, demonstrating a command mode of the video game, in accordance with an embodiment of the invention.

With reference to FIG. 3D, a view 100 of a video game illustrating a command mode of the video game is shown, in accordance with an embodiment of the invention. The view 100 is shown on a display, 16, which is connected to a game computer 14, and viewed by a player 10. A player's first-person character 101 is shown, along with AI character 156a, which the player may control. The nodes 156b, 156c and 156d indicate specified locations for the AI character 156a, and are connected by lines 156e which indicate the path for the AI characters 156a to navigate. Node 156c has been placed on a vehicle, and includes an icon of a grenade, indicating that when the AI character 156a reaches the location specified by node 156c, the AI character will detonate a grenade to destroy the vehicle.

Figure 3E:
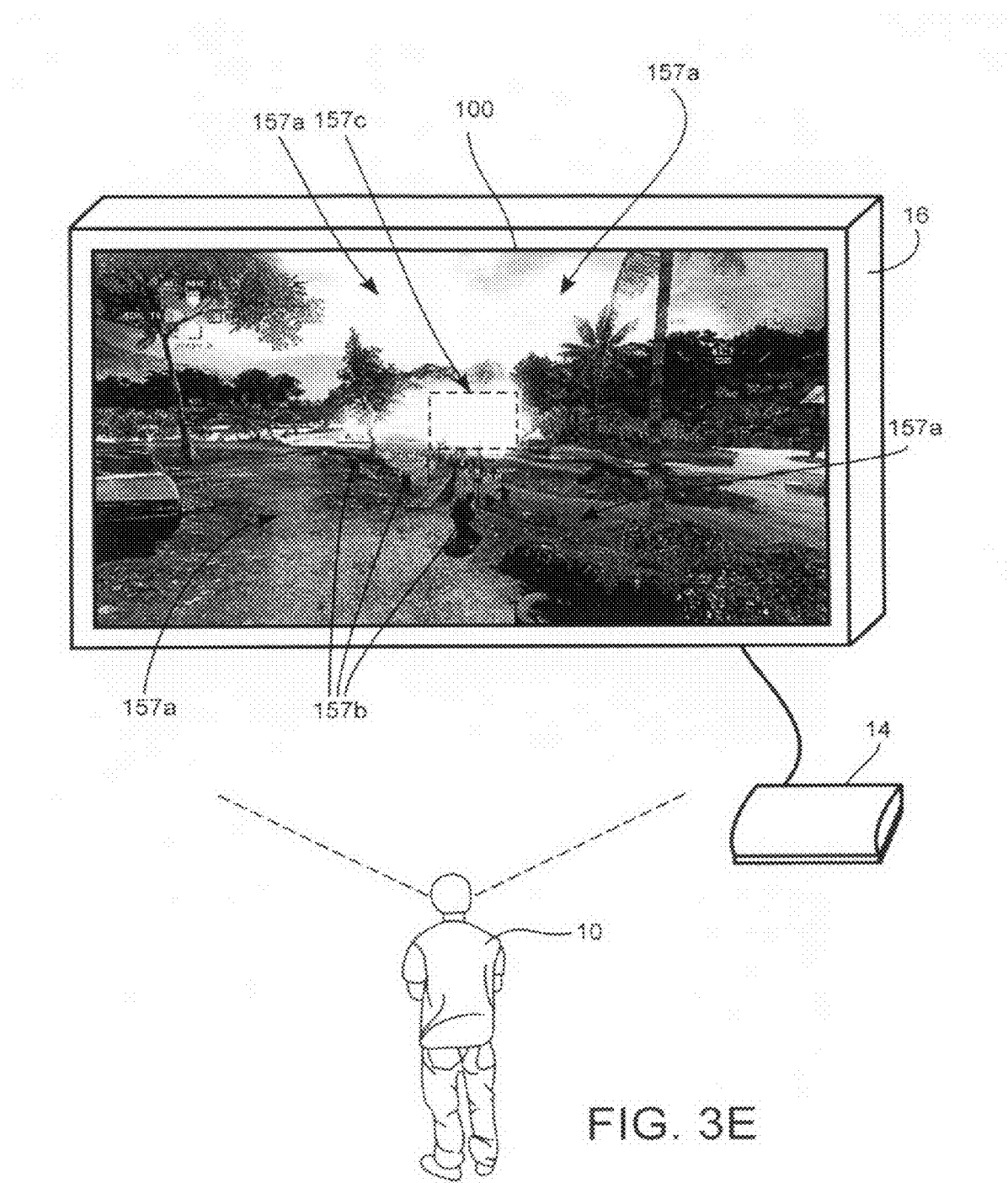
FIG. 3E illustrates a view of a video game, demonstrating a command mode of the video game, in accordance with an embodiment of the invention.

With reference to FIG. 3E, a view 100 of a video game is shown, illustrating a command mode of the video game. The view 100 is shown on a display 16, which is connected to a game computer 14, and viewed by a player 10. The view 100 is a field of view of a spatial field of the video game. In the present instance, the command mode has enabled the player 10 to "call in" and airstrike, which is indicated by explosion 157c. The location of the airstrike may be specified in accordance with previously described methods, such as my maneuvering a command reticle to a desired location, and selecting the location to receive an airstrike.

With continued reference to FIG. 3E, in order to distinguish the command mode of the video game from regular gameplay, and to help the player 110 focus on salient aspects of the game, a color desaturation method is applied, in accordance with an aspect of the invention. When the command mode is entered, the color of the general areas of the view, as indicated at 157a, is desaturated. However, points of interest such as characters 157b and the explosion 157c are not desaturated, and are shown as normal. This causes the characters 157b and the explosion 157c to stand out against the desaturated remainder of the view 100.

Figure 4:
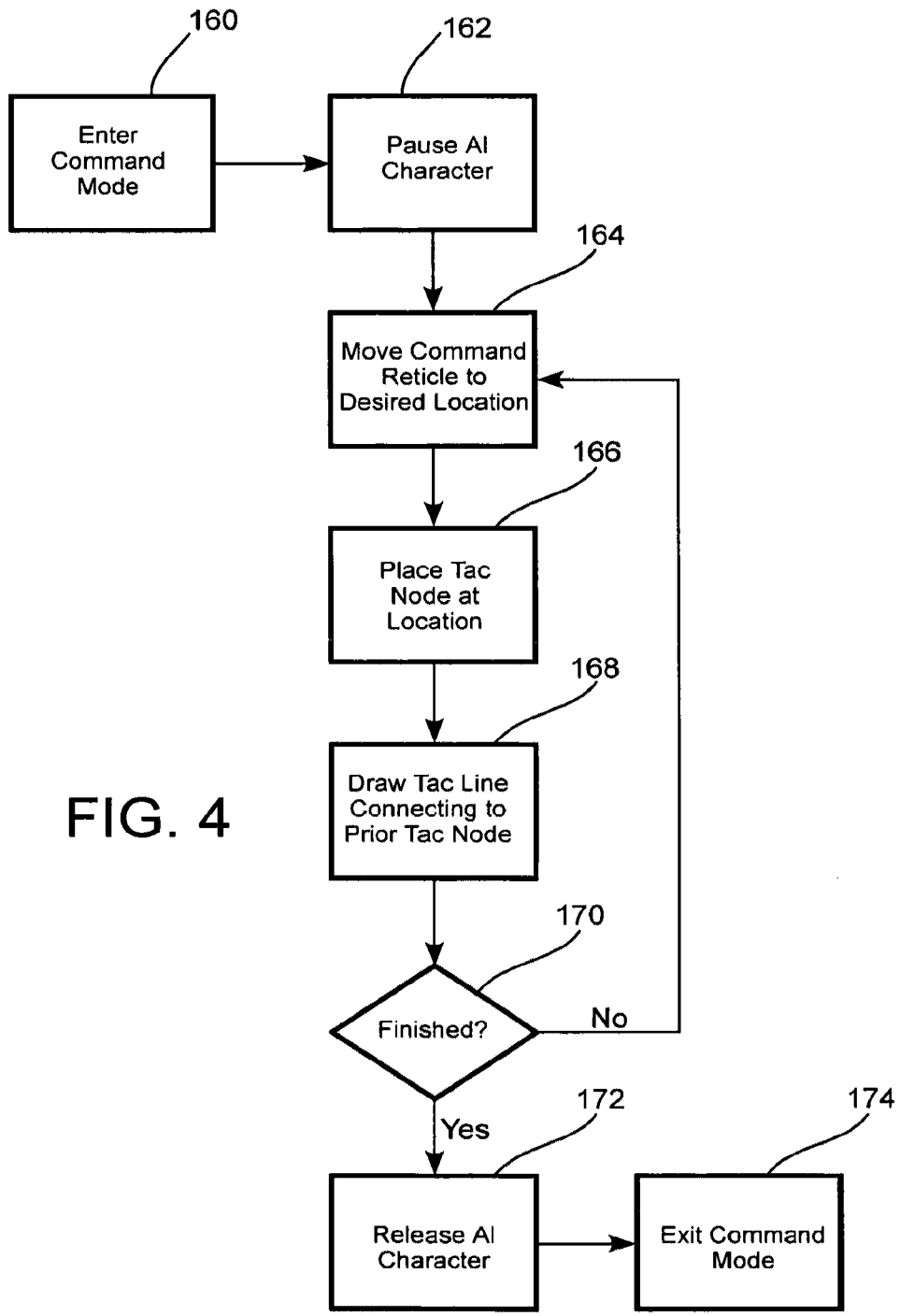
FIG. 4 illustrates a method for controlling an artificial-intelligence character in a video game, in accordance with an embodiment of the invention.

With reference to FIG. 4, a method for controlling an AI character in a video game is shown, in accordance with an embodiment of the invention. At step 160, a command mode of the video game is entered. The command mode enables control of the AI character, and entering the command mode occurs while substantially maintaining an existing display of the game. By substantially maintaining an existing display of the game, the player of the video game is not significantly removed from the immersive environment of the game. At step 162, the AI character is paused so as to halt its activity and place the AI character in a waiting state.

At step 164, a command reticle is maneuvered to a desired location, the desired location being a location within the spatial field of the game to which the player wishes the AI character to travel. At step 166 a tactical node ("tac" node) is placed at the desired location which indicates to the player the specification of the location. At step 168, a tactical line ("tac" line) is drawn connecting the just-placed tac node to a previously-placed tac node (if one exists). At step 170, it is determined whether the player is finished placing tac nodes. If not, then the method steps 164, 166, and 168 may be repeated until the player has completed placing tac nodes. When the player has finished, then the AI character is released at step 172, at which time the AI character begins moving to each of the tac nodes in the order they were placed, generally following the path indicated by the tac lines. At step 174, the command mode is exited so as to resume normal gameplay control.

Figure 5A:
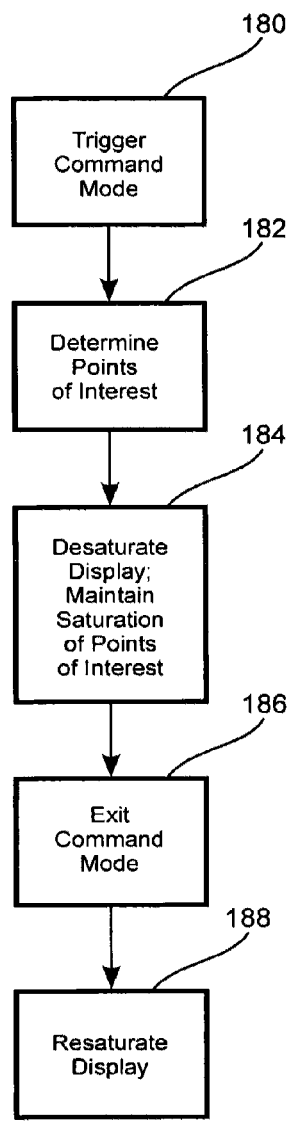
FIG. 5A illustrates a method for distinguishing a command mode of a video game by selectively adjusting color saturation, in accordance with an embodiment of the invention.

With reference to FIG. 5A, a method for distinguishing a command mode of a video game by selectively adjusting color saturation is shown, in accordance with an embodiment of the invention. At step 180, a player triggers a command mode of the video game, the command mode enabling the player to provide command/control data to determine the activity of AI characters. When the command mode is entered, the existing display of the video game is substantially maintained, so as to continue presenting the immersive environment of the video game to the player. At step 182, points of interest within the player's view of the video game are determined. The points of interest may comprise various objects and/or locations which may be of importance to the player, such as characters, explosions, weapons-fire, vehicles, buildings, assorted structures, supplies, key destination points, etc.

At step 184, the color saturation of the display of the video game is desaturated, while the color saturation of the determined points of interest is maintained. The amount of desaturation effect applied may vary in different embodiments, and in the case where desaturation is 100%, then those portions of the display which are desaturated will appear in grayscale. In various embodiments, the degree to which the color saturation of the points of interest is maintained may vary depending on the nature of the points of interest. For example, in one embodiment, the color saturation of characters is completely maintained, while the color saturation of other objects is maintained to a lesser degree. At step 186, the command mode is exited, so as to return to normal gameplay control of the video game. At step 188, upon exiting the command mode, the display is resaturated, restoring the original color saturation of the display of the game.

Figure 5B:
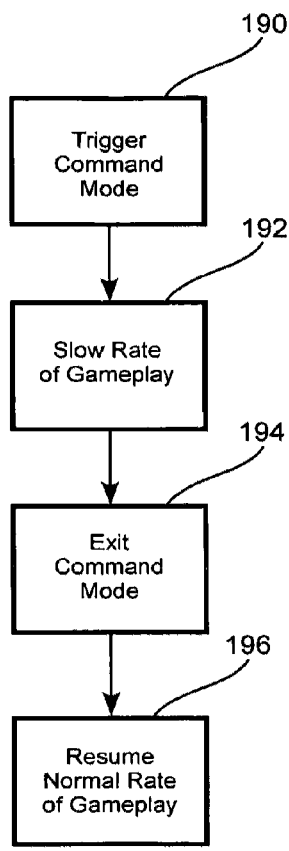
FIG. 5B illustrates a method for distinguishing a command mode of a video game by adjusting a rate of gameplay, in accordance with an embodiment of the invention.

With reference to FIG. 5B, a method for distinguishing a command mode of a video game by adjusting a rate of gameplay is shown, in accordance with an embodiment of the invention. At step 190, a player triggers a command mode of the video game, the command mode enabling the player to provide command/control data to determine the activity of AI characters. When the command mode is entered, the existing display of the video game is substantially maintained, so as to continue presenting the immersive environment of the video game to the player. At step 192, the rate of gameplay of the video game is slowed, but not stopped. Thus, actions and events within the game occur at a reduced rate which affords time for the player to strategically determine the actions of the AI characters. However, because the game is not completely stopped, the time-based progression of events which contributes to the feel of the game is preserved. Thus, the player continues to experience the time-sensitive aspect of the game, but at a reduced rate. At step 194, the player exits the command mode, which restores normal control of the video game. Upon exiting the command mode, the normal rate of gameplay is resumed at step 196, thus returning the player to the regular gameplay environment.

Figure 5C:
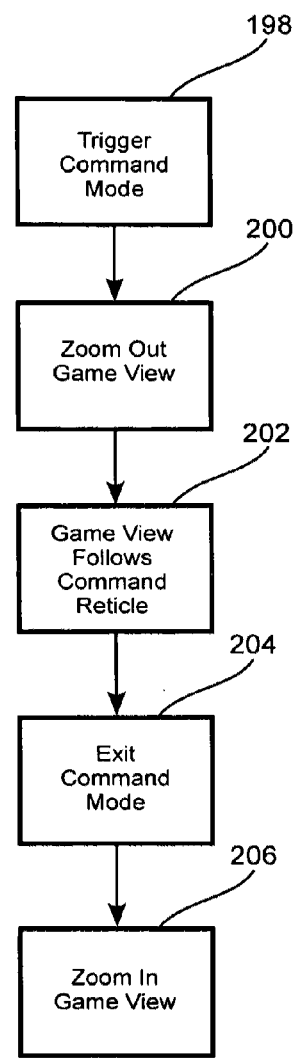
FIG. 5C illustrates a method for distinguishing a command mode of a video game by adjusting a game view, in accordance with an embodiment of the invention.

With reference to FIG. 5C, a method for distinguishing a command mode of a video game by adjusting a game view is shown, in accordance with an embodiment of the invention. At step 198, a player triggers a command mode of the video game, the command mode enabling the player to provide command/control data to determine the activity of AI characters. When the command mode is entered, the existing display of the video game is substantially maintained, so as to continue presenting the immersive environment of the video game to the player. At step 200, the game view, which is the view that the player sees, is zoomed out. This enables the player to simultaneously view a larger area of the spatial field of the video game. Thus, the player is better able to strategically determine the actions of the AI characters in the context of the spatial field of the video game.

At step 202, the game view "follows" a command reticle which is maneuvered by the player to various locations in the video game. In other words, the command reticle essentially behaves as the player's first-person "character" so that the view of the game is based on the perspective of the command reticle and tracks the movement of the command reticle. At step 204, the player exits the command mode. Upon exiting the command mode, the game view is zoomed in to the normal perspective at step 206, thus restoring the player to the normal gameplay view.

Figure 6:
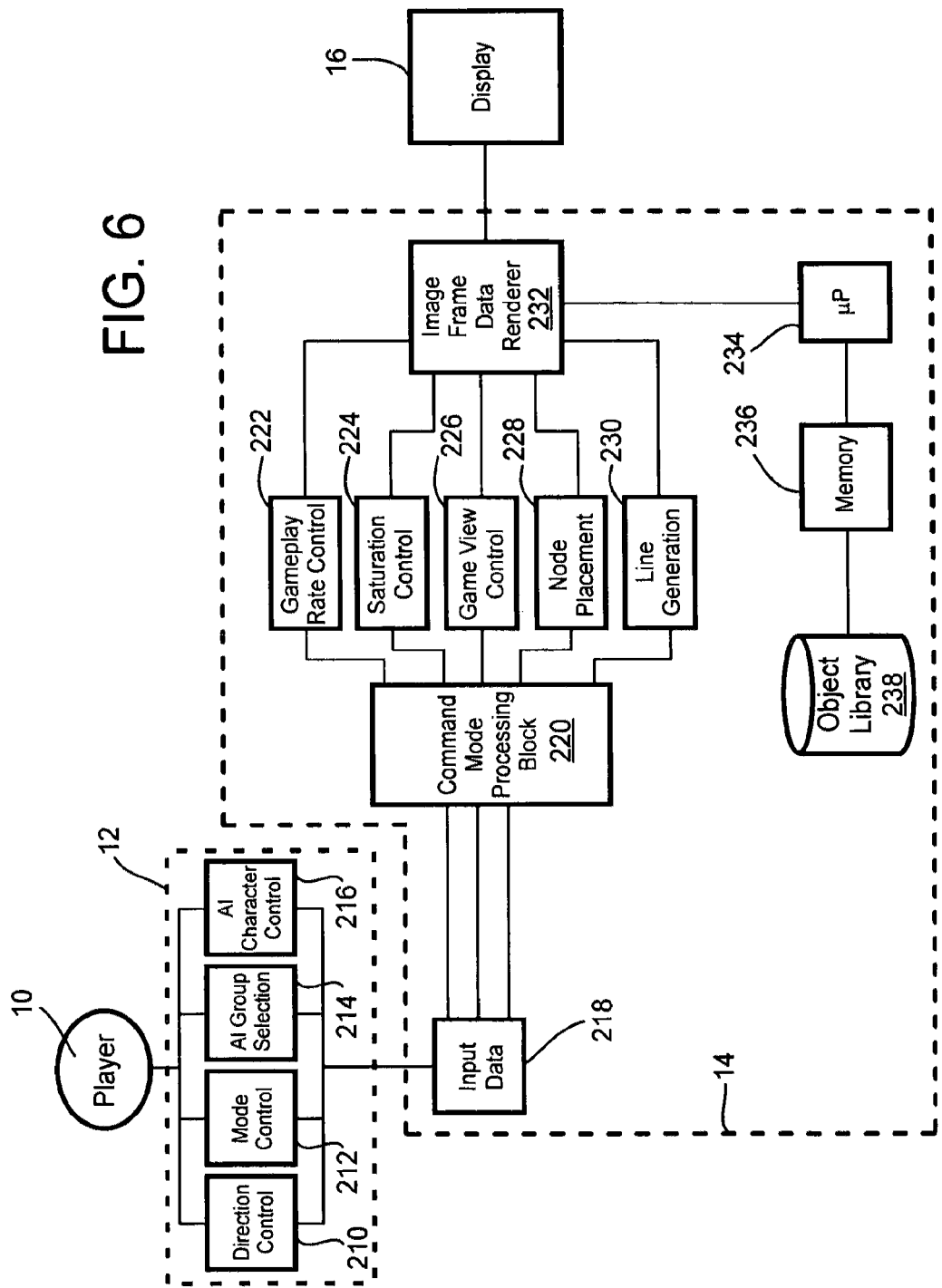
FIG. 6 illustrates a system for enabling control of artificial-intelligence characters of a video game, in accordance with an embodiment of the invention.

With reference to FIG. 6, a system for enabling control of AI characters of a video game is shown, in accordance with an embodiment of the invention. A user 10 provides inputs via a controller 12 to a gaming console/computer 14. The inputs include: a direction control 210, which enables the user 10 to enter directional inputs; a mode control, for toggling on or off a command mode of the video game; an AI group selection, which enables the user 10 to selectively provide control inputs for different groups of AI characters; and an AI character control, which enables the user 10 to directly control AI characters by pausing them so as to place them in a waiting status, or releasing them to continue their activity, which may include command/control data specified during the command mode.

The inputs are received by an input data module 218, and processed by a command mode processing block 220. The command mode processing block 220 executes the command mode of the video game, the command mode enabling the player 10 to control AI characters. The command mode processing block 220 accesses multiple modules which effect the various aspects of the command mode, by affecting image frame data which is rendered by image frame data renderer 232 to a display 16, thereby forming a display of the game.

A gameplay rate control module 222 slows the rate of gameplay of the game during execution of the command mode. This allows the player more time to strategically plan and determine the activities of the AI characters, without unnaturally stopping the gameplay entirely. A saturation control module 224 adjusts the color saturation of the image frame data which defines a display of the game, so as to highlight points of interest within the game. When the command mode is triggered, the saturation control module 224 first determines the points of interest within the display of the game. Then the color saturation of the display of the game is reduced while maintaining the color saturation of the points of interest. In this manner, the points of interest appear highlighted to the player due to their color saturation. A game view control module 226 effects a zoom-out of the display of the game upon trigerring the command mode, such that the player is able to view a larger area of the spatial field of the video game at once. This facilitates a greater scope of awareness to aid the player in strategically setting control of the AI characters.

A node placement module 228 enables a player to specify locations within the spatial field of the video game, which are visually represented by nodes, for AI characters to travel to. To place a node, a player utilizes the direction control 210 to maneuver a command reticle to a desired location, and then selects the location to place a node. In one embodiment, the AI characters may be organized in groups, and therefore the node placement module accommodates placement of nodes for a group of AI characters via the AI group selection 24. A series of specified locations represented by a series of nodes defines a path for the AI character(s) to traverse. This path is represented by lines connecting the nodes which are created by the line generation module 230.

A microprocessor 234, memory 236 and an object library 238 are included within the console/computer 14, these being utilized to execute the aforementioned modules of the video game system. It will be understood by those skilled in the art that the illustrated configuration is merely one possible configuration utilizing such components, and that others may be practiced without departing from the scope of the present invention.

Figure 7:
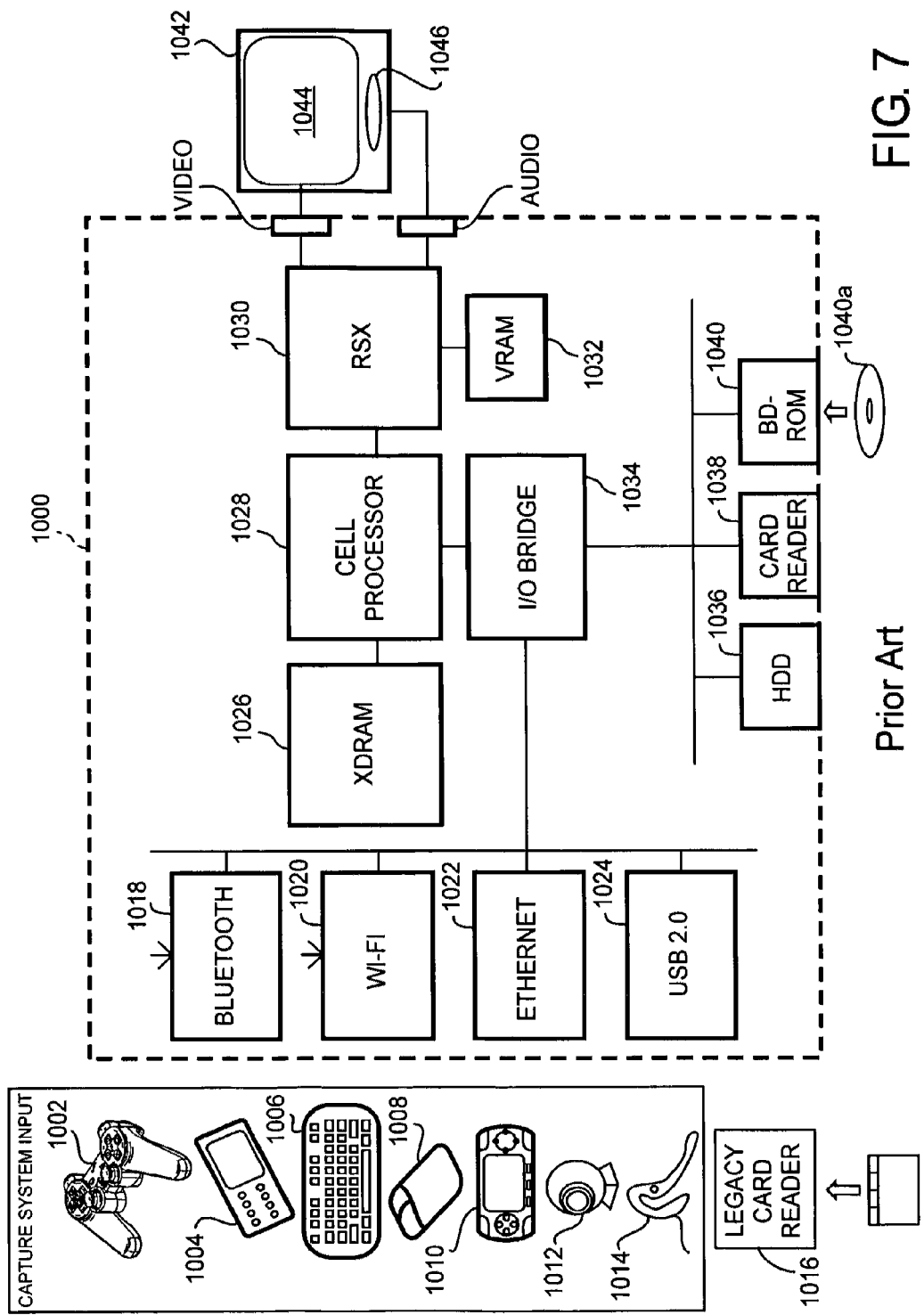
FIG. 7 illustrates the overall system architecture of the Sony® Playstation 3® entertainment device.

FIG. 7 schematically illustrates the overall system architecture of the Sony® Playstation 3® entertainment device, a computer system capable of utilizing dynamic three-dimensional object mapping to create user-defined controllers in accordance with one embodiment of the present invention. A system unit 1000 is provided, with various peripheral devices connectable to the system unit 1000. The system unit 1000 comprises: a Cell processor 1028; a Rambus® dynamic random access memory (XDRAM) unit 1026; a Reality Synthesizer graphics unit 1030 with a dedicated video random access memory (VRAM) unit 1032; and an I/O bridge 1034. The system unit 1000 also comprises a Blu Ray® Disk BD-ROM® optical disk reader 1040 for reading from a disk 1040a and a removable slot-in hard disk drive (HDD) 1036, accessible through the I/O bridge 1034. Optionally the system unit 1000 also comprises a memory card reader 1038 for reading compact flash memory cards, Memory Stick® memory cards and the like, which is similarly accessible through the I/O bridge 1034.

The I/O bridge 1034 also connects to six Universal Serial Bus (USB) 2.0 ports 1024; a gigabit Ethernet port 1022; an IEEE 802.11b/g wireless network (Wi-Fi) port 1020; and a Bluetooth® wireless link port 1018 capable of supporting of up to seven Bluetooth connections.

In operation the I/O bridge 1034 handles all wireless, USB and Ethernet data, including data from one or more game controllers 1002. For example when a user is playing a game, the I/O bridge 1034 receives data from the game controller 1002 via a Bluetooth link and directs it to the Cell processor 1028, which updates the current state of the game accordingly.

The wireless, USB and Ethernet ports also provide connectivity for other peripheral devices in addition to game controllers 1002, such as: a remote control 1004; a keyboard 1006; a mouse 1008; a portable entertainment device 1010 such as a Sony Playstation Portable® entertainment device; a video camera such as an EyeToy® video camera 1012; and a microphone headset 1014. Such peripheral devices may therefore in principle be connected to the system unit 1000 wirelessly; for example the portable entertainment device 1010 may communicate via a Wi-Fi ad-hoc connection, whilst the microphone headset 1014 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1016 may be connected to the system unit via a USB port 1024, enabling the reading of memory cards 1048 of the kind used by the Playstation® or Playstation 2® devices.

In the present embodiment, the game controller 1002 is operable to communicate wirelessly with the system unit 1000 via the Bluetooth link. However, the game controller 1002 can instead be connected to a USB port, thereby also providing power by which to charge the battery of the game controller 1002. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1004 is also operable to communicate wirelessly with the system unit 1000 via a Bluetooth link. The remote control 1004 comprises controls suitable for the operation of the Blu Ray Disk BD-ROM reader 1040 and for the navigation of disk content.

The Blu Ray Disk BD-ROM reader 1040 is operable to read CD-ROMs compatible with the Playstation and PlayStation 2 devices, in addition to conventional pre-recorded and recordable CDs, and so-called Super Audio CDs. The reader 1040 is also operable to read DVD-ROMs compatible with the Playstation 2 and PlayStation 3 devices, in addition to conventional pre-recorded and recordable DVDs. The reader 1040 is further operable to read BD-ROMs compatible with the Playstation 3 device, as well as conventional pre-recorded and recordable Blu-Ray Disks.

The system unit 1000 is operable to supply audio and video, either generated or decoded by the Playstation 3 device via the Reality Synthesizer graphics unit 1030, through audio and video connectors to a display and sound output device 1042 such as a monitor or television set having a display 1044 and one or more loudspeakers 1046. The audio connectors 1050 may include conventional analogue and digital outputs whilst the video connectors 1052 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1028. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1012 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1000. The camera LED indicator is arranged to illuminate in response to appropriate control data from the system unit 1000, for example to signify adverse lighting conditions. Embodiments of the video camera 1012 may variously connect to the system unit 1000 via a USB, Bluetooth or Wi-Fi communication port. Embodiments of the video camera may include one or more associated microphones that are also capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 1000, an appropriate piece of software such as a device driver should be provided. Device driver technology is well-known and will not be described in detail here, except to say that the skilled man will be aware that a device driver or similar software interface may be required in the present embodiment described.

Embodiments of the present invention also contemplate distributed image processing configurations. For example, the invention is not limited to the display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

With the above embodiments in mind, it should be understood that the invention may employ various computer-implemented operations involving data stored in computer systems. These operations include operations requiring physical manipulation of physical quantities. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. In a computer-implemented game, a method for controlling an artificial-intelligence (AI) character, the method comprising:
    entering a session of a command mode, the command mode enabling control of the AI character, the entering a command mode occurs while maintaining a view of a virtual space of the game;
    during the session of the command mode, receiving input sequentially specifying a plurality of user-defined locations within the virtual space of the game, an initial location and the plurality of user-defined locations defining a path for the AI character to traverse in the virtual space;
    moving the AI character along the path from the initial location to the plurality of user-defined locations in the order they were specified.

2. The method of claim 1, wherein the specifying a plurality of locations further comprises:
    maneuvering a reticle to each of the locations;
    selecting each of the plurality of locations when the reticle is situated at each of the plurality of locations.

3. The method of claim 2, wherein the specifying a plurality of locations further comprises:
    displaying a node in the virtual space of the game at each of the plurality of locations.

4. The method of claim 3, wherein the specifying a plurality of locations further comprises:
    displaying a series of lines connecting the nodes in the virtual space of the game.

5. The method of claim 2, wherein the view of the virtual space of the game is shifted in accordance with the maneuvering a reticle, so as to maintain a display of the reticle in a central portion of the view.

6. The method of claim 1, wherein the entering a command mode further comprises:
    slowing a rate of gameplay of the game, wherein slowing the rate of gameplay is defined by a slowing of a gameplay clock so that activity of the game proceeds at a slower rate than a normal rate of activity.

7. The method of claim 1, wherein the entering a command mode further comprises:
    determining points of interest within the virtual space of the game;
    reducing color saturation of the view of the virtual space of the game while maintaining color saturation of the points of interest.

8. The method of claim 7, wherein the points of interest are selected from the group consisting of: characters, gun-fire, and explosions.

9. The method of claim 1, wherein the entering a command mode further comprises:
    enlarging a field of view of the view of the virtual space of the game.

10. The method of claim 1, further comprising
    specifying an action to be performed by the AI character at one or more of the plurality of locations.

11. The method of claim 1, wherein the moving the AI character begins immediately upon specification of a first one of the plurality of locations.

12. The method of claim 1, further comprising:
    prior to the specifying of the plurality of locations, halting any existing movement of the AI character;
    after the plurality of locations have been specified, then releasing the AI character to follow the path.

13. A computer system for executing a game, the game including an artificial-intelligence (AI) character, the system comprising:
- a controller for receiving and relaying user input to said game;
- a display for displaying image frame data of the game;
- a command mode processor for executing a command mode of the game, the executing a command mode enabling control of the AI character and occurring while maintaining a view of a virtual space of the game, the command mode processor comprising
- a node placement module for enabling a user to specify a plurality of user-defined locations within the virtual space of the game, an initial location and the plurality of user-defined locations defining a path for the AI character to traverse in the virtual space.

14. The computer system of claim 13, wherein the specification of the plurality of locations is facilitated by enabling the user to maneuver a command reticle to each of the plurality of the locations and selecting each of the plurality of locations when the reticle is situated at each of the plurality of locations.

15. The computer system of claim 13, wherein the specification of the plurality of locations includes displaying a node in the existing display of the game at each of the plurality of locations.

16. The method of claim 15, wherein the specification of the plurality of locations further includes displaying a series of lines connecting the nodes in the virtual space of the game.

17. The computer system of claim 14, wherein the view of the virtual space of the game is shifted in accordance with the maneuvering a reticle, so as to maintain a display of the reticle in a central portion of the view.

18. The computer system of claim 13, wherein the command mode processor further comprises
- a gameplay rate control module for slowing a rate of gameplay of the game during execution of the command mode, wherein slowing the rate of gameplay is defined by a slowing of a gameplay clock so that activity of the game proceeds at a slower rate than a normal rate of activity.

19. The computer system of claim 13, wherein the command mode processor further comprises a saturation display control, the saturation display control for determining points of interest within the virtual space of the game and reducing color saturation of the view of the virtual space of the game while maintaining color saturation of the points of interest.

20. The method of claim 19, wherein the points of interest are selected from the group consisting of: characters, gunfire, and explosions.

21. The method of claim 13, wherein the executing a command mode includes enlarging a field of view of the view of the virtual space of the game.

22. The method of claim 13, wherein the node placement module further enables a user to specify an action to be performed by the AI character at one or more of the plurality of locations.

23. The method of claim 1, wherein moving the AI character occurs after exiting the session of the command mode.

\* \* \* \* \*